US006819855B2

(12) United States Patent
Fujiwara et al.

(10) Patent No.: US 6,819,855 B2
(45) Date of Patent: Nov. 16, 2004

(54) CLIP REMOVING TOOL AND CLIP REMOVING METHOD

(75) Inventors: Kunihiko Fujiwara, Sakura (JP); Yukio Hayashi, Sakura (JP); Yasuhiro Tamaki, Sakura (JP); Yoshikazu Nomura, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 10/344,304

(22) PCT Filed: Aug. 7, 2001

(86) PCT No.: PCT/JP01/06769

§ 371 (c)(1),
(2), (4) Date: Jul. 29, 2003

(87) PCT Pub. No.: WO02/12939

PCT Pub. Date: Feb. 14, 2002

(65) Prior Publication Data

US 2004/0013388 A1 Jan. 22, 2004

(30) Foreign Application Priority Data

Aug. 7, 2000 (JP) ........................................ 2000-239216

(51) Int. Cl.⁷ ................................................. G02B 6/00
(52) U.S. Cl. .......................................... 385/134; 385/53
(58) Field of Search ............................... 385/53, 72, 88, 385/134–137

(56) References Cited

U.S. PATENT DOCUMENTS 6,095,695 A * 8/2000 Ohtsuka et al. ............... 385/72
6,364,534 B1 * 4/2002 Lampert ....................... 385/53
6,682,230 B1 * 1/2004 Demangone et al. ......... 385/88

FOREIGN PATENT DOCUMENTS

| JP | 61-89809 | 6/1986 | ............ G02B/6/38 |
| JP | 63-84103 A1 | 6/1988 | |
| JP | 07-020355 | 1/1995 | ............ G02B/6/36 |
| JP | 07-326460 A1 | 12/1995 | |
| JP | 2000-206370 | 7/2000 | ............ G02B/6/38 |
| WO | 99/21040 | 4/1999 | ............ G02B/6/39 |

* cited by examiner

Primary Examiner—Phan T. H. Palmer
(74) Attorney, Agent, or Firm—Darby & Darby

(57) ABSTRACT

The present invention is applied to a structure in which to attach a backplane connector to a backplane so that the backplane connector can be moved by a desired amount, a clip from which a pair of elastic pawls project is used to engage the backplane with the backplane connector through holes in the backplane. The present invention allows the clip of this structure to be removed efficiently. That is, the present invention provides a clip removing tool 50 comprising disengaging pieces 52a and 52b that push in a pair of elastic pawls 29b through an attaching slot 31 in a backplane 23, the elastic pawls 29b being engaged with locking portions 34 on opposite side portions of a BH housing 26 are pushed, to disengage the elastic pawls 29b from the locking portions 34, as well as a clip removing method using this clip removing tool.

12 Claims, 34 Drawing Sheets

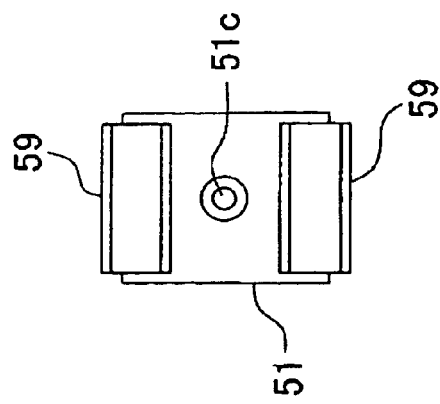
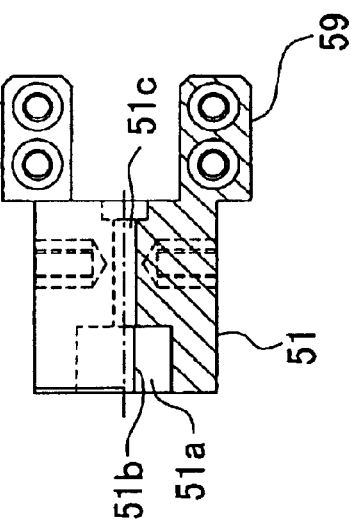
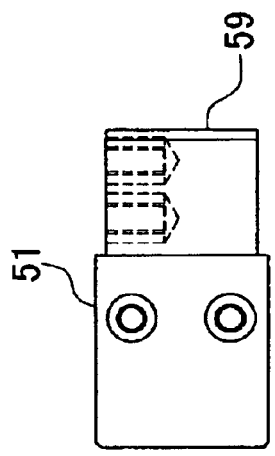
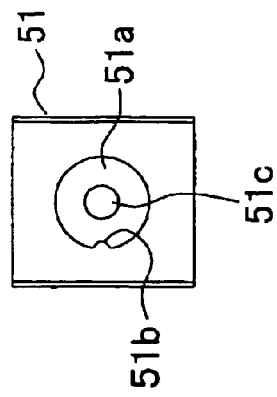

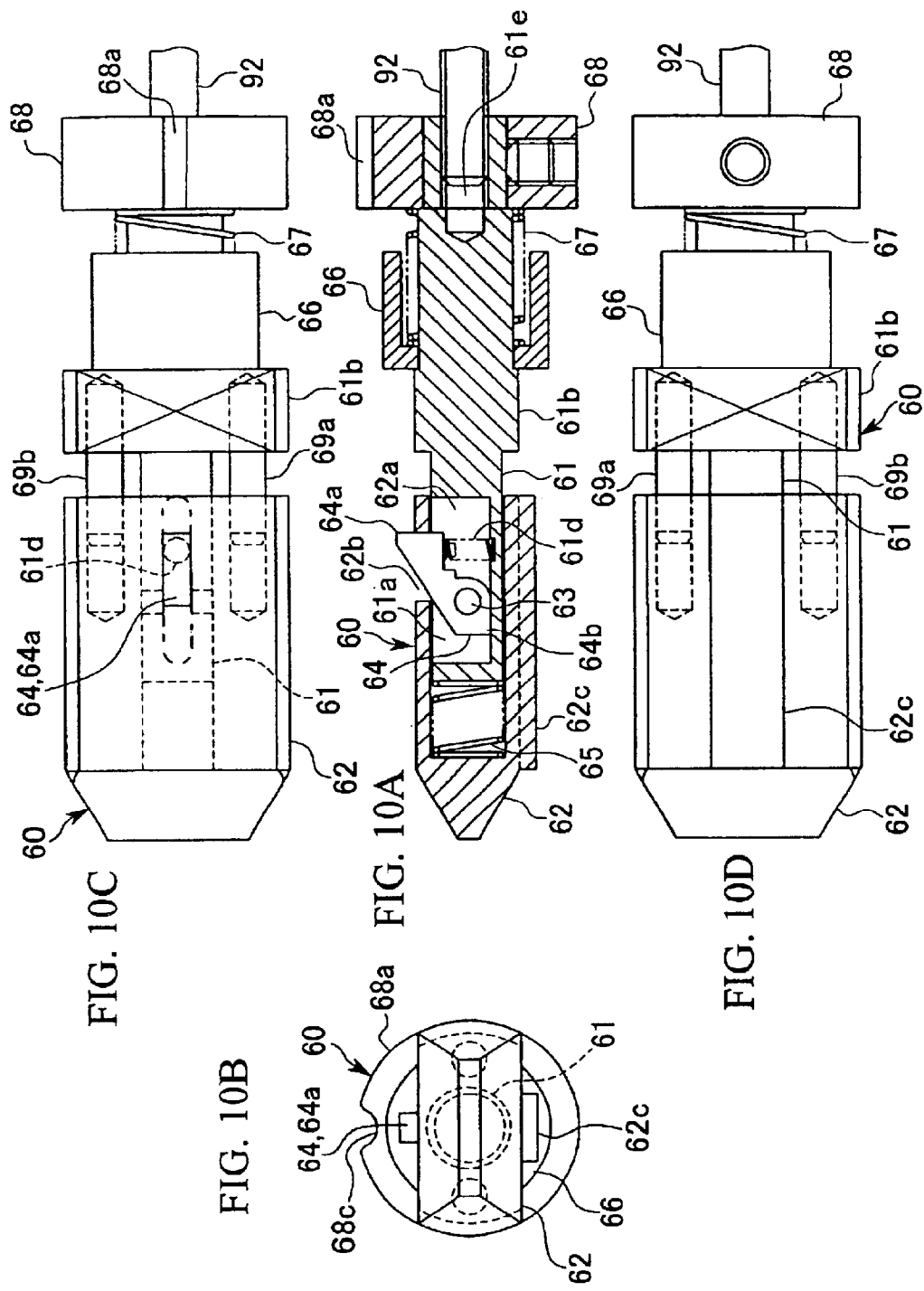

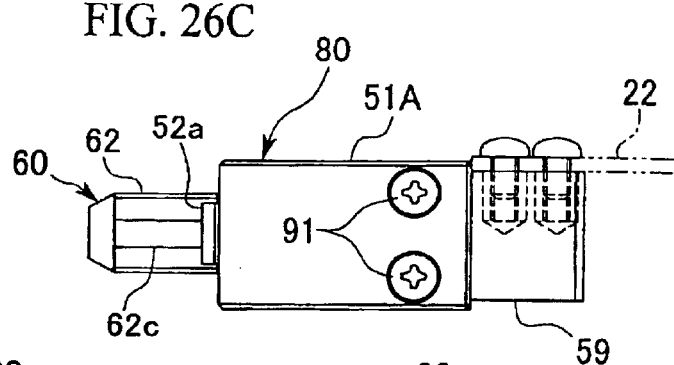
FIG. 26C
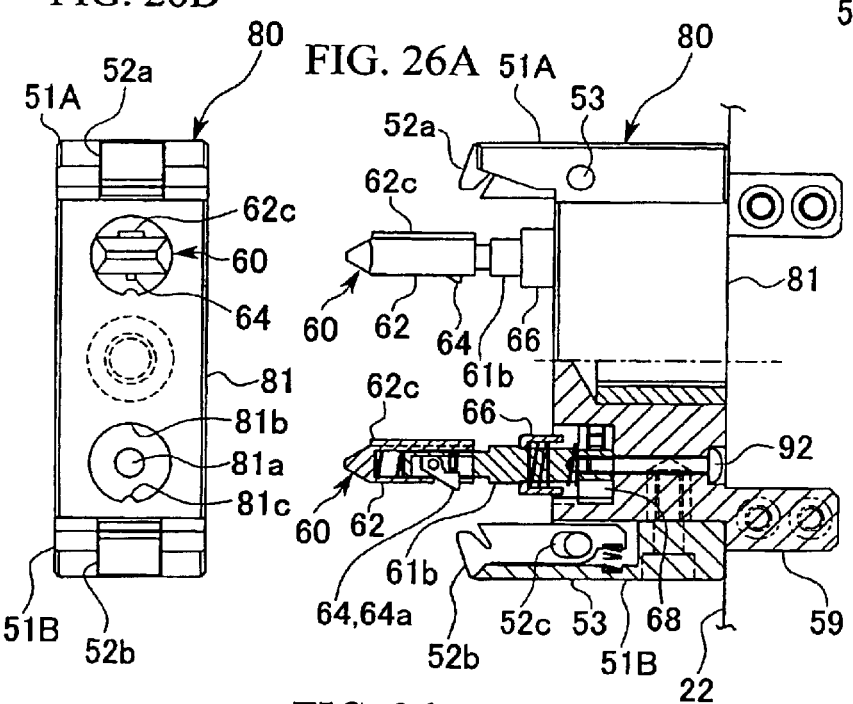
FIG. 26B
FIG. 26A
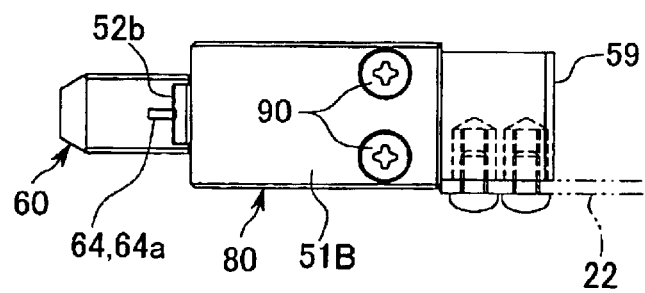
FIG. 26D

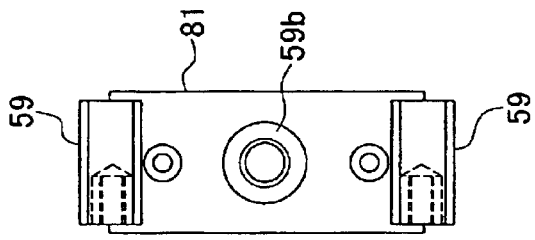
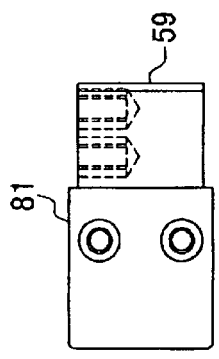
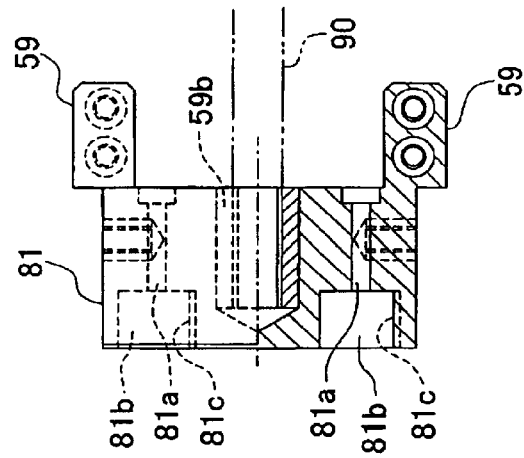
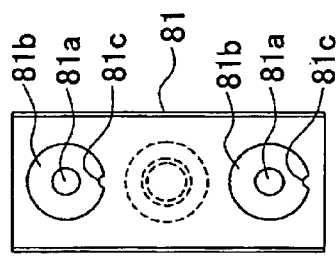
FIG. 27A
FIG. 27B
FIG. 27C
FIG. 27D

CLIP REMOVING TOOL AND CLIP REMOVING METHOD

TECHNICAL FIELD

The present invention relates to a clip removing tool and method used to remove a clip used to attach an optical connector to a backplane.

BACKGROUND ART

Backplane connectors have hitherto been provided as optical connectors of a plug-in type.

FIG. 36 shows an example of a backplane connector. In FIG. 36, reference numeral 1 denotes a plug-in unit, reference numeral 2 denotes a printed board, and reference numeral 3 denotes a backplane. Reference numerals 4a and 4b denote MPO connector plugs (hereinafter referred to as "MPO plugs"), reference numeral 5 denotes a printed board housing (hereinafter referred to as a "PH housing"), and reference numeral 6 denotes a backplane housing (hereinafter referred to as a "BH housing").

With this backplane connector, by inserting the printed board 2 to which the PH housing 5 is fixed into the plug-in unit 1, the PH housing 5 is fitted into the BH housing 6 attached to the backplane 3 arranged on a side portion of the plug-in unit 1. The PH housing 5 and the BH housing 6 fitted into each other constitute an optical connector adapter 7. The optical connector adapter 7 allows the connection of the MPO plugs 4a and 4b inserted into the optical connector adapter 7 from its opposite sides. The MPO plug 4a inserted into the optical connector adapter 7 from the PH housing 5 side is inserted into the PH housing 5 beforehand. It is then inserted into the optical connector adapter 7 at the same time when the printed board 2 is inserted into the plug-in unit 1. A plurality of printed boards 2 can be densely accommodated in parallel in the plug-in unit 1. Consequently, this backplane connector allows optical connector adapters 7 to be densely mounted.

The MPO plugs 4a and 4b are optical connectors comprising an optical connector ferrule 4c specified in Japanese Industrial Standard JIS C 5981 and supported in a plastic housing.

FIG. 37 is an exploded perspective view showing a structure in which the BH housing 6 is mounted on the backplane 3. As shown in FIG. 37, the BH housing 6 is mounted on the backplane 3 so as to sandwich the backplane 3 between the BH housing 6 and a rear surface housing 9 arranged opposite the BH housing 6 via the backplane 3. That is, pins 10 projecting from the BH housing 6 arranged at the printed board 2 side (the left of FIG. 37) of the backplane 3 are inserted into an attaching slot 11 so as to project from the opposite side of the backplane 3. The rear surface housing 9 is fixed to the projecting ends of the pins 10 using screws 12. Thus, the backplane 3 is sandwiched between the BH housing 6 and the rear surface housing 9. A slot is formed in a housing main body 8 of the BH housing 6 and in the rear housing 9 so that the optical connector plug 4b (MPO plug) is inserted into these slots via the attaching slot 11 in the backplane 3. However, these slots are omitted from FIG. 37.

The BH housing 6 is mounted on the backplane 3 so as to be movable a small distance. For example, in FIG. 37, extended portions 13 formed by extending four corners of the rectangular attaching slot 11 allow the screws 12, connecting the BH housing 6 and the rear surface housing 9 together, to move a small distance. This movable range of the screws 12 allows the BH housing 6 to move a small distance. The movement of the BH housing 6 absorbs dimensional tolerances to the BH housing 6 and PH housing 5 to contribute to smooth fitting operations.

However, with the backplane connector, the small size (about 1.2 mm in diameter) of the screws 12 results in the need of much time and labor to fix the rear surface housing 9 using a hand tool. Furthermore, it takes much time and labor to form the pins 10, threaded holes 16 (see FIG. 37), and attaching slot 11 corresponding to the screws 12.

Furthermore, the movement range of the backplane housing 6 depends on the sliding resistance of the housing main body 8 and rear surface housing 9 to the backplane 3, the magnitude of the clearance between the housing main body 8 or rear surface housing 9 and the backplane 3, or the like. A small variation in the size of the clearance significantly affects the movement range or degree of freedom of the backplane housing 6. Accordingly, it takes much time and labor to adjust the clearance. That is, if a useless gap is created between the housing main body 8 and the rear surface housing 9 because of the tolerances to the backplane 3, notably the tolerance to its thickness dimension, then the movement range of the backplane housing 6 is unnecessarily widened. This makes it difficult to fit the printed board housing 5. In contrast, if the backplane 3 has a thickness larger than a predetermined one, it may be difficult to move the backplane housing 6 or fix the backplane housing 6 using the screws 12.

Thus, with the backplane connector of the conventional configuration, it takes much time and labor to ensure the desired movement range of the backplane housing 6. On the other hand, when the entire backplane 3 is formed precisely in view of these problems, costs increase sharply.

To solve these problems, the inventor has developed a backplane connector comprising a clip from which elastic pawls project and which is arranged opposite a backplane housing via a backplane so that the elastic pawls allowed to penetrate an attaching slot formed in the backplane engages with the backplane. Accordingly, the backplane housing is mounted on the backplane so that the backplane is sandwiched between the backplane connector and the clip. With this backplane connector, the movement range of the backplane housing can be set on the basis of the movable range of the elastic pawls in the attaching slot formed in the backplane. Consequently, compared to the conventional structure using screws, the movement range of the backplane housing can be set easily. Furthermore, ensuring the accuracy of formation of the elastic pawls reduces the need for the accuracy of formation required for the backplane housing and the parts of the clip other than the elastic pawls. Therefore, costs can be reduced.

However, this backplane connector requires development of a technique of easily disengaging the elastic pawls of the clip from the backplane housing when replacement of the clip or the like is carried out for replacement of the backplane housing, a change in movement range, or the like. That is, the backplane connector must have a reduced size in order to improve mounting density. Accordingly, it is desirable to reduce the elastic pawls or locking portions of the backplane housing on which the corresponding elastic pawls are locked. However, a reduction in the size of the locking portions and elastic pawls may make it difficult to disengage the elastic pawls from the locking portions. Conversely, when the size of the elastic pawls is increased in order to facilitate the disengagement, it is difficult to increase the mounting density. Furthermore, for example, the backplane housing mounted on the backplane of the plug-in unit is located at the innermost position of the plug-in unit. Thus, it is very difficult to disengage the elastic pawls of the clip from the backplane housing.

The present invention is provided in view of these problems. It is an object of the present invention to provide a clip removing tool and method that allows a clip to be disengaged easily from a backplane housing.

DISCLOSURE OF THE INVENTION

A first aspect of the present invention is a clip removing tool used to disengage an optical connector from a clip used to attach the optical connector to a backplane, the clip removing tool being characterized by comprising a removing tool main body advanced toward or retreated from the optical connector and disengaging pieces projecting from the removing tool main body, and in that the disengaging pieces are pushed against engaging pawls projecting from side portions of elastic pawl leading end portions of the clip, to deform the engaging pawls to reduce the amount of parts of the engaging pawls which project from the elastic pawl leading end portions, thus disengaging the engaging pawls from the optical connector.

In this case, the disengaging pieces are pushed against, for example, the engaging pawls projecting from the side portions of the elastic pawl leading end portions of the clip to deform the engaging pawls, thus reducing the amount of parts of the engaging pawls which project from the elastic pawl leading end portions.

Furthermore, the disengaging pieces of the clip removing tool may be rotatably supported on the removing tool main body, and may each comprise, at its leading end in a direction in which the disengaging piece projects from the removing tool main body, an engaging pawl pushing portion that pushes the corresponding engaging pawl to reduce the amount of part of the engaging pawl which projects from the elastic pawl leading end portion, thus disengaging the engaging pawl from a locking portion provided in the optical connector, and an abutting portion that pushes the corresponding elastic pawl as the removing tool main body advances toward the optical connector.

Alternatively, the removing tool main body may be provided with an attachment used to separately attach an operation handle for an operation of advancement toward or retreat from the optical connector.

Furthermore, the removing tool main body may be provided with a holding engaging portion that engages with the optical connector.

A second aspect of the present invention is a clip removing method of disengaging an optical connector from a clip used to attach the optical connector to a backplane, the method being characterized by comprising pushing a holding tool against the backplane to disengage the clip from the optical connector.

In this case, elastic pawls are disengaged from the optical connector by, for example, disengaging the elastic pawls of the clip from the optical connector held using the holding tool and then removing the optical connector from a neighborhood of the backplane together with the holding tool. More specifically, for example, engaging pawls projecting from side portions of elastic pawl leading end portions of the clip are pushed to reduce the amount of parts of the engaging pawls which project from the elastic pawl leading end portions. Then, with this state maintained, the elastic pawl leading end portions are pushed to move the elastic pawls to positions where the engaging pawls do not engage with the optical connector.

In the first and second aspects of the present invention, the "optical connector" attached to the backplane may have any configuration and may be, for example, the backplane housing of the backplane connector.

Furthermore, the holding tool used in the second aspect of the present invention may be the above described clip removing tool comprising a holding engaging portion or an exclusive holding tool which is separate from the clip removing tool and which is used to hold the optical connector by engagement, fitting, gripping, or the like. However, a holding tool also used as a clip removing tool is more advantageous in that it enables the elastic pawls of the clip to be disengaged from the optical connector while simultaneously holding the optical connector, in that it allows the optical connector to be removed easily (operability), in that it serves to reduce costs, and the like.

BRIEF DESCRIPTION OF THE DRAWINGS

FIG. 7A is a partial side sectional view showing a removing tool main body constituting the clip removing tool in FIG. 5;

FIG. 7B is a plan view showing the removing tool main body constituting the clip removing tool in FIG. 5;

FIG. 7C is a side view showing the removing tool main body constituting the clip removing tool in FIG. 5, as viewed from its front;

FIG. 7D is a side view showing the removing tool main body constituting the clip removing tool in FIG. 5, as viewed from its rear;

FIG. 10A is a horizontal sectional view showing the configuration of a holding engaging portion provided in the clip removing tool in FIG. 5;

FIG. 10B is a side view showing the holding engaging portion provided in the clip removing tool in FIG. 5 as viewed from its leading end portion;

FIG. 10C is a side view showing the holding engaging portion provided in the clip removing tool in FIG. 5 as viewed from its side on which a window in an inserting cap is formed;

FIG. 10D a side view showing the holding engaging portion provided in the clip removing tool in FIG. 5 as viewed from its side opposite to the side shown in FIG. 10C;

FIG. 26A is a partial side sectional view showing the clip removing tool in FIG. 25;

FIG. 26B is a side view showing the clip removing tool in FIG. 25 and also showing that one of the holding engaging portions has been removed as viewed from the front of the clip removing tool in a direction in which the clip removing tool is pushed against the BH housing (the left of FIG. 26A);

FIG. 26C is a plan view showing the clip removing tool in FIG. 25;

FIG. 26D is a bottom view showing the clip removing tool in FIG. 25;

FIG. 27A is a partial side sectional view showing a removing tool main body of the clip removing tool in FIG. 25;

FIG. 27B is a plan view showing the removing tool main body of the clip removing tool in FIG. 25;

FIG. 27C is a side view showing the removing tool main body of the clip removing tool in FIG. 25 as viewed from its front;

FIG. 27D is a side view showing the removing tool main body of the clip removing tool in FIG. 25 as viewed from its rear;

BEST MODE FOR CARRYING OUT THE INVENTION

Embodiments of the present invention will be described below with reference to the drawings.

First, description will be given of a backplane connector (hereinafter referred to as a "BP connector") to which a clip removing tool according to the present invention is applied.

Figure 1:
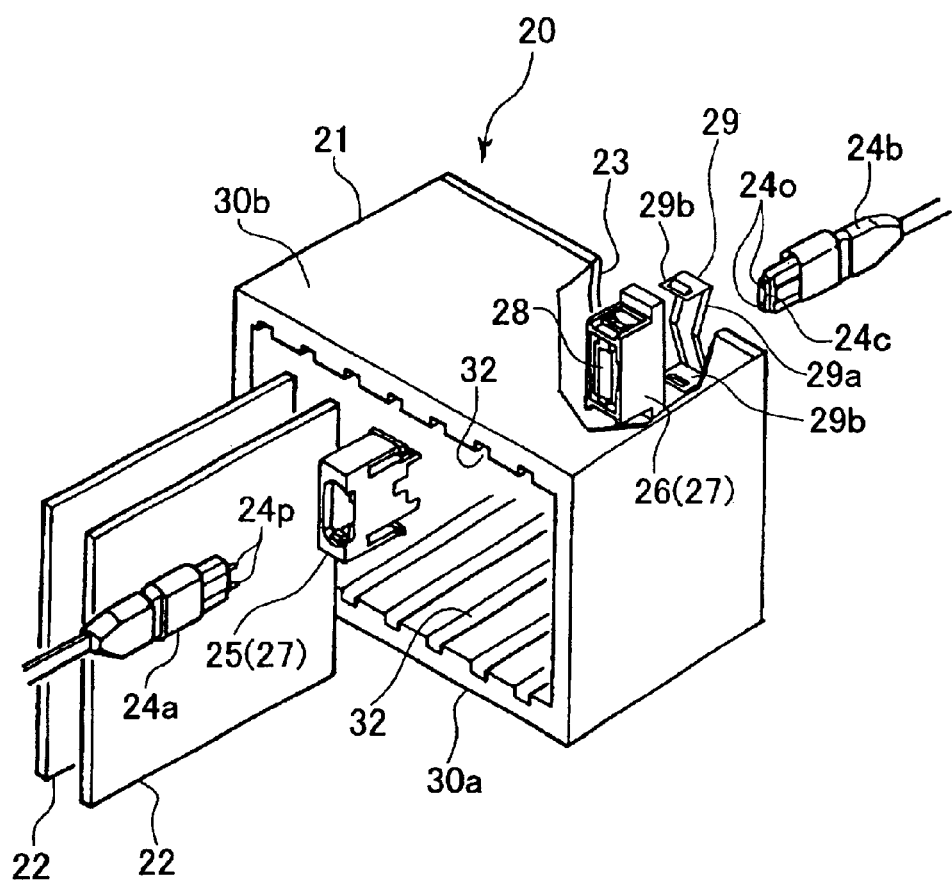
FIG. 1 is an exploded perspective view showing an example of a backplane connector to which a clip removing tool according to the present invention is applied.
Figure 2:
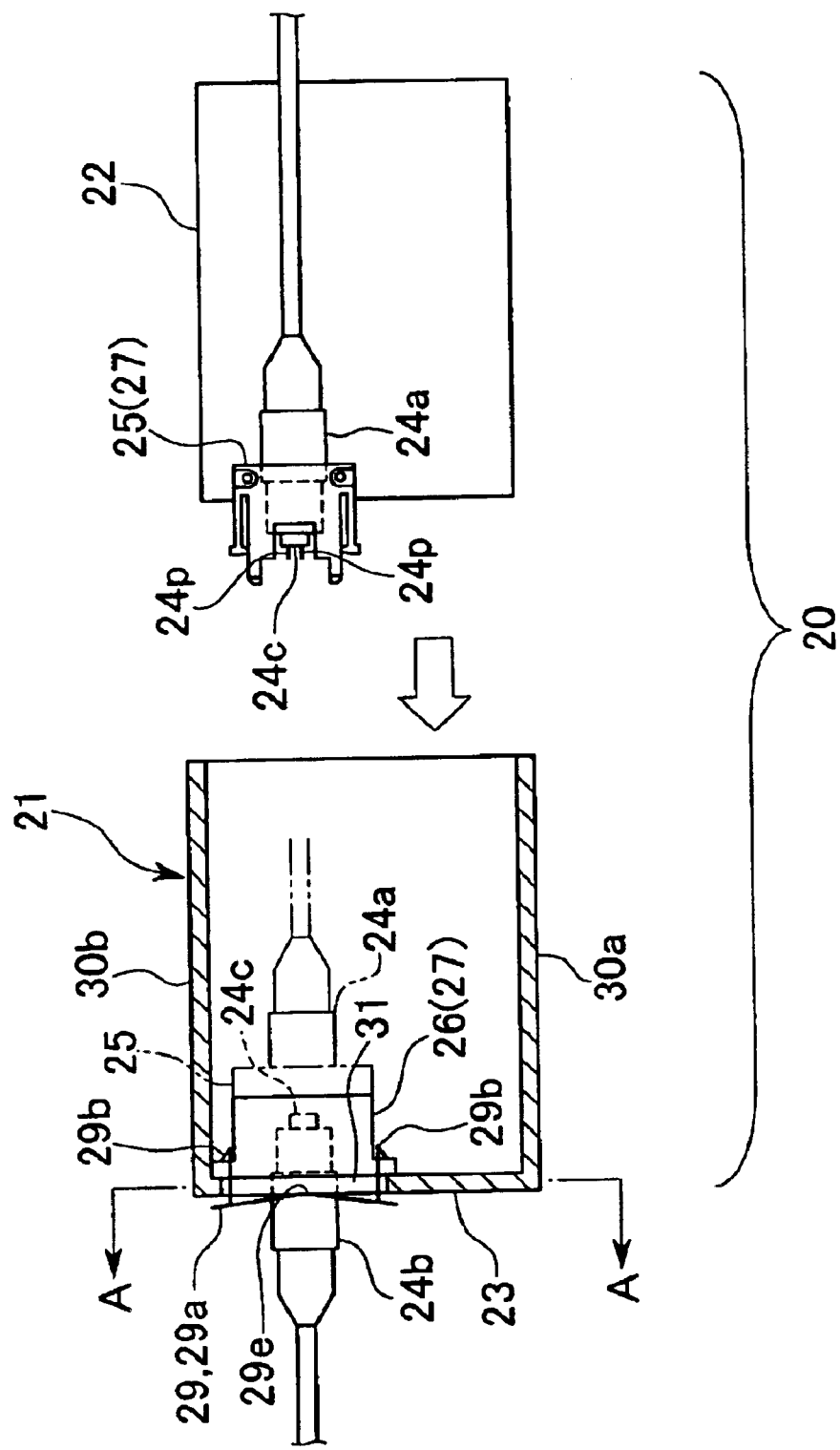
FIG. 2 is a side sectional view showing the back plane connector in FIG. 1.

FIG. 1 is an exploded perspective view showing an example of a BP connector. FIG. 2 is a side sectional view. In FIGS. 1 and 2, reference numeral 20 denotes a BP connector, reference numeral 21 denotes a plug-in unit, and reference numeral 22 denotes a printed board. Reference numeral 23 denotes a backplane, reference numerals 24a and 24b denote optical connector plugs, and reference numeral 25 denotes a printed board housing (hereinafter referred to as a "PH housing"). Reference numeral 26 denotes an optical connector attached to the backplane 23, in this case, a backplane housing (hereinafter sometimes referred to as a "BH housing"). The "backplane housing" or "BH housing" will be sometimes referred to as an "optical connector".

With the BP connector 20 illustrated in FIGS. 1 and 2, the printed board 22 to which the PH housing 25 is fixed is inserted into the plug-in unit 2, and the PH housing 25 is fitted into the BH housing 26 attached to the backplane 23 of the plug-in unit 21. Then, the PH housing 25 and the optical connector plugs 24a and 24b, already inserted into the BH housing 26 for engagement and retention, are connected together. The PH housing 25 and BH housing 26, which have been fitted together, constitute an optical connector adapter 27 used to connect together the optical connector plugs 24a and 24b inserted from the opposite sides of the BP connector.

The optical connector plugs 24a and 24b used in this case are, for example, optical connector plugs (hereinafter sometimes referred to as "MPO plugs") for so-called MPO (Mlutifiber Push On) type optical connectors specified in Japanese Industrial Standards JIS C 5982 and International Electrotechnical Commission IEC 1754-7. That is, these optical connector plugs 24a and 24b are optical connectors each comprising an optical connector ferrule 24c which is an MT (Mechanically Transferable) type optical connector specified in the JIS C 5981 and which is supported in a plastic housing. The optical connector ferrule 24c generally has its tips were PC (Physical Contact) polished.

Specifically, the optical connector ferrules 24c and 24c specified in the JIS C 5981 are abutted and connected together by inserting and fitting a guide pin 24p already fitted into one of the optical connector ferrules 24c so as to project from its junction end surface, into a guide pin hole 24o drilled in the other optical connector ferrule 24c, to achieve accurate positioning. By slightly moving the BH housing 26, the PH housing 25 is fitted precisely, enabling the guide pin 24p to be inserted and fitted smoothly into the guide pin hole. This allows the optical connector ferrules 24c to be connected together more easily.

The optical connector plugs 24a and 24b are not limited to the previously described MPO plugs but may be arbitrarily configured.

Figure 3:
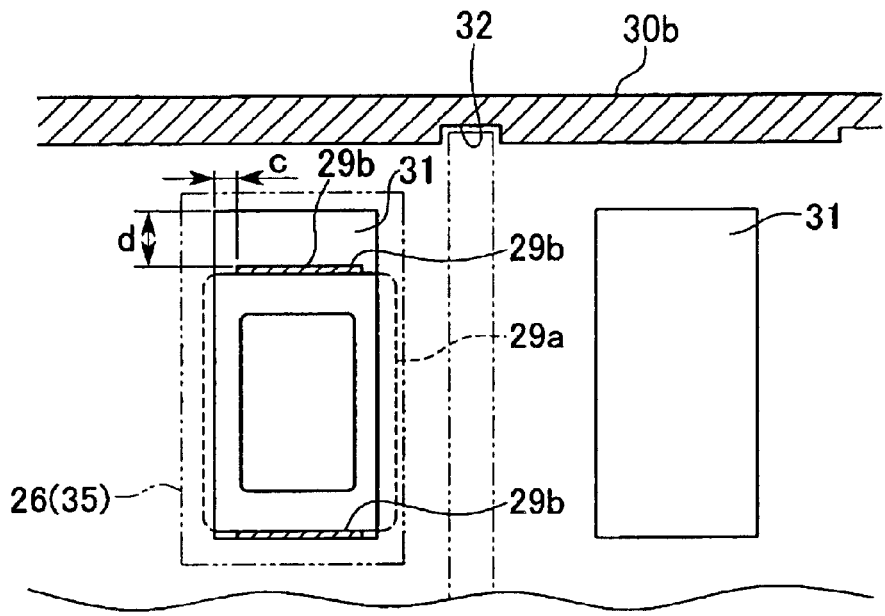
FIG. 3 is a diagram showing the neighborhood of an attaching slot into which elastic pawls of a clip used to attach a BH housing of the backplane connector in FIG. 1 to a backplane are inserted, and also showing the movable range of the elastic pawls in the attaching slot.

By engaging with the clip 29 provided opposite the BH housing 26 via the backplane 23, the BH housing 26 is attached to the backplane 23 so that the backplane 23 is sandwiched between the BH housing 26 and the clip 29. The BH housing 26 is arranged at the printed board 22 side (the right of FIG. 2) of the backplane 23. The clip 29 is arranged opposite the BH housing 26 via the backplane 23. In FIGS. 2 and 3, the clip 29 is provided with a pair of elastic pawls 29b projecting from the opposite sides (the vertically opposite ends in FIGS. 2 and 3) of main body portion 29a like a rectangular frame. The backplane 23 is sandwiched between the clip 29 and the BH housing 26 by engaging the elastic pawls 29b allowed to penetrate an attaching slot 31 formed in the backplane, with the BH housing 26. The outer shapes of the BH housing 26 and the main body portion 29a of the clip 29 are larger than the attaching slots 31 so as not to fit into the slots 31. Further, the frame-like space inside the main body portion 29a of the clip 29 is large enough to allow the optical connector plug 24b to be inserted into the space. This space is also in communication with the attaching slot 31. Parts of the backplane 23 and main body portion 29a which are located around the attaching slot 31 do not interfere with the optical connector plug 24b inserted into and connected to the BH housing 26 even if the BH housing 26 is moved. These parts do not affect the state in which the optical connector plug 24b has been inserted into and connected to the BH housing 26.

Furthermore, the BH housing 26 can be moved within the attaching slot 31 by ensuring, for example, a movable dimension c in the lateral direction of FIG. 3 and a movable dimension d in the vertical direction of FIG. 3 so that both elastic pawls 29b of the clip 29 are movable. Thus, movement of the BH housing 26 absorbs the dimensional tolerances when the PH housing 25 is fitted into the PH housing 26. This allows fitting operations to be performed more easily.

Furthermore, the main body portion 29a of the clip 29 is bent or curved (bent in FIGS. 1, 2, and 4) at a vertex 29e in its central portion in the vertical direction. By abutting the vertex 29e against the backplane 23, the BH housing 26 can be rotationally moved easily in a vertical plane around the vertex 29e. Furthermore, the main body portion 29a itself functions as a plate spring to ensure the movement range of the BH housing 26. The main body portion 29a always exerts spring force on the elastic pawls 29b because of reaction force generated when the vertex 29e pushes the backplane 23. This maintains the contact of engaging pawls 29d projecting from leading end portions 29c of the elastic pawls 29b with locking portions 34 of the BH housing 26, under pressure to prevent disengagement. Furthermore, inadvertent movement (vibration) of the BH housing 26 is prevented to avoid adverse effects such as degradation of characteristics caused by vibration.

In this regard, the clip is not limited to the above configuration but may be arbitrarily configured. However, with any configuration, the clip generally allows the BH housing 26 to move.

A plurality of attaching holes 31 are arranged in parallel (laterally in FIG. 3) in the backplane 23 of the plug-in unit 21. A plurality of BH housings 26 are mounted in the plug-in unit 21 in parallel by assembling the BH housings 26 in these attaching slots 31. Furthermore, the printed boards 22 can be inserted into the plug-in unit 21 correspondingly to the respective BH housings 26. Thus, connector adapters 27, each composed of the PH housing 25 and the BH housing 26, can be densely mounted in the BP connector 20.

With the plug-in unit 21, the BH housing 26 into which the PH housing 25 is fitted can be selected by selectively inserting the printed board 22 into one of a plurality of guide grooves 32 (see FIGS. 1 and 3 the guide grooves are not shown in FIG. 2) formed in an upper and lower bottom plates 30a and 30b (see FIG. 2) of the plug-in unit 21. On the basis of the accuracy of positioning of the printed board 22 based on the guide grooves 32, the PH housing 25 is positioned relative to the BH housing 26 and is inserted and fitted into it.

Specifically, the clip 29 is obtained by molding an elastic plate material such as a metal plate to form the main body portion 29a and the pair of elastic pawls 29b.

Figure 4:
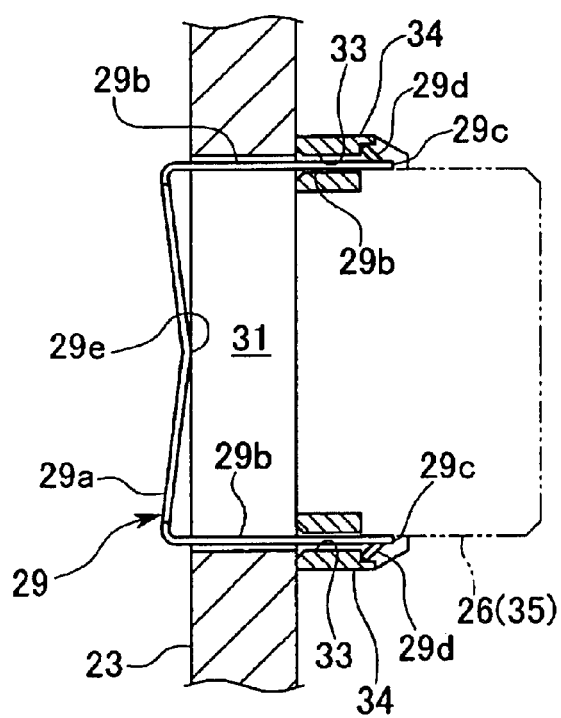
FIG. 4 is a side sectional view showing how the BH housing of the backplane connector in FIG. 1 are engaged with the clip.

FIG. 4 shows a structure in which the clip 29 and the BH housing 26 engage with each other. As shown in FIG. 4, the elastic pawls 29b are inserted, from the backplane 23 side, into corresponding pawl inserting slots 33 penetrating vertically opposite sides (vertical sides in FIG. 4) of the BH housing 26. Then, the elastic pawls 29b are engaged with the BH housing 26 so as not to be successfully pulled out, by engaging engaging pawls 29d with the corresponding locking portions 34 provided on the side portions of the BH housing 26, the engaging pawls 29d projecting from side portions of elastic pawl leading end portions 29c penetrating the corresponding pawl inserting slots 33 and projecting toward the PH housing 25. The engaging pawl 29d is formed by obliquely raising a part of the leading end portion 29c of the elastic pawl 29b like a plate spring so as to open toward the outside of a corresponding one of the pair of elastic pawls 29b, that is, in a direction opposite to the opposite elastic pawl 29b. The engaging pawl 29d projects obliquely from the leading end portion 29c of the elastic pawl toward the main body portion 29a.

By being pushed into the corresponding pawl inserting slot 33 from the backplane 23 side, the elastic pawl 29b is inserted into the pawl inserting slot 33 while elastically deforming the corresponding engaging pawl 29d. The engaging pawl 29d of each elastic pawl 29b penetrates through the pawl inserting slot 33 toward the PH housing 25, while returning to its original projecting state owing to its own elasticity. The engaging pawl 29d then engages with a wall-like locking portion 34 provided outside the BH housing 26 and adjacent to the pawl inserting slot 33. This stably maintains the engagement between the clip 29 and the BH housing 26 unless the engaging pawl 29d is pushed in substantially parallel with the elastic pawl 29b and is disengaged from the locking portion 34.

Figure 5:
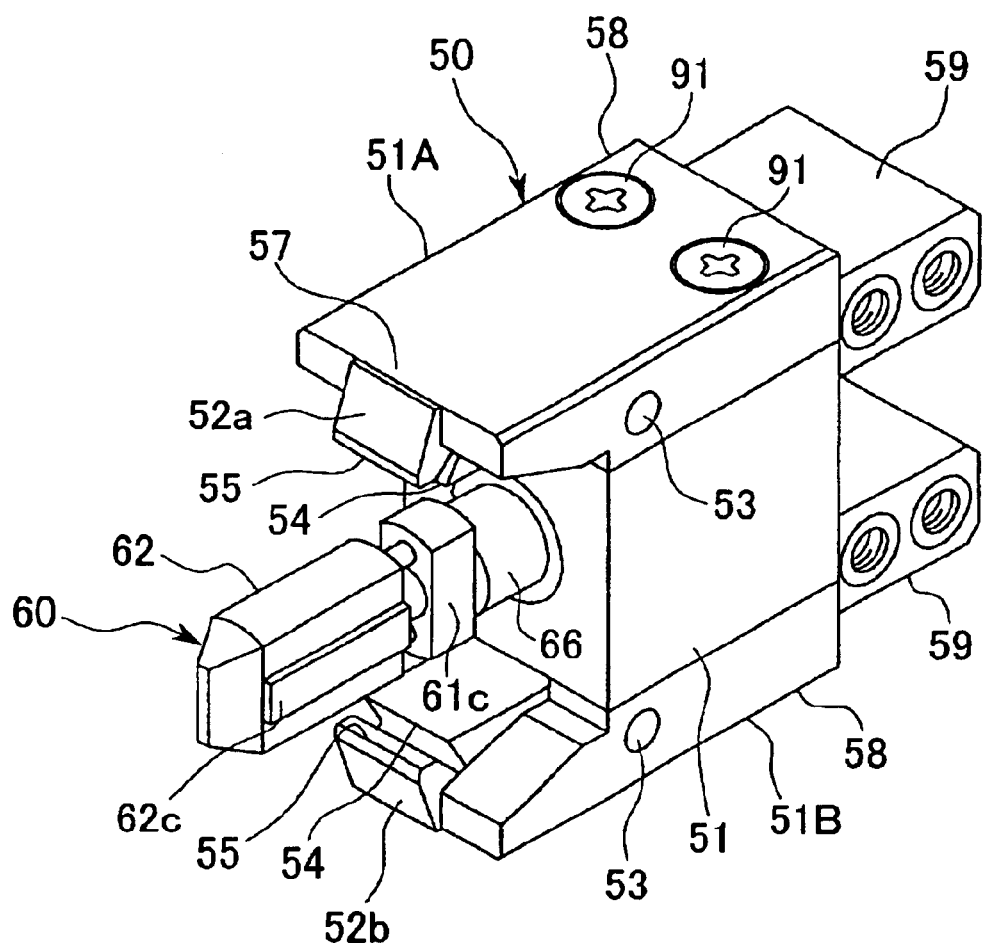
FIG. 5 is a perspective view showing a clip removing tool applied to the BH housing of the backplane connector in FIG. 1 and the clip.
Figure 9A:
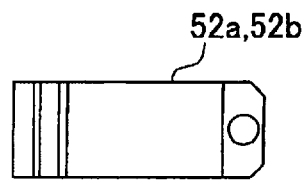
FIG. 9A is a plan view showing a disengaging piece attached to the frame in FIG. 8.
Figure 9B:
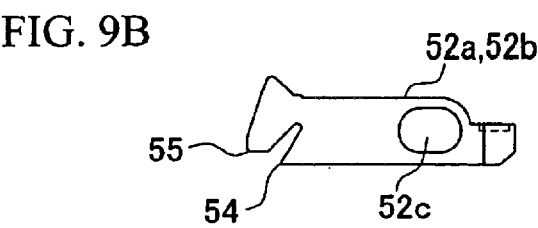
FIG. 9B is a side view showing the disengaging piece attached to the frame in FIG. 8.
Figure 11A:
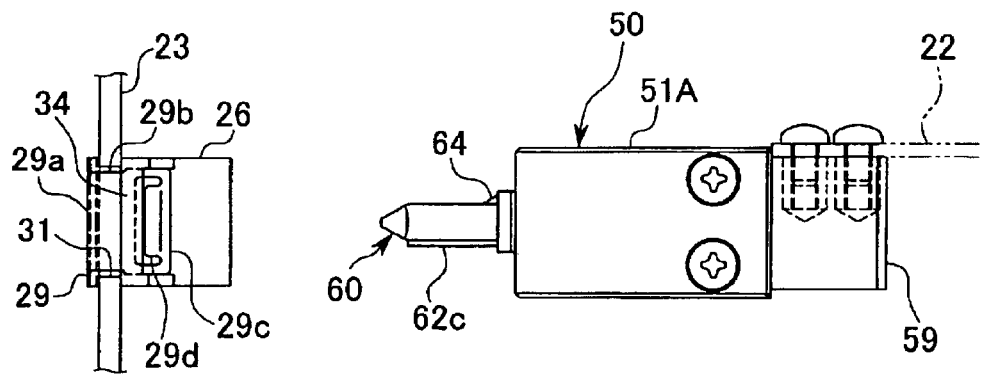
FIG. 11A is a plan view showing a state observed before the clip removing tool is pushed against the BH housing.
Figure 11B:
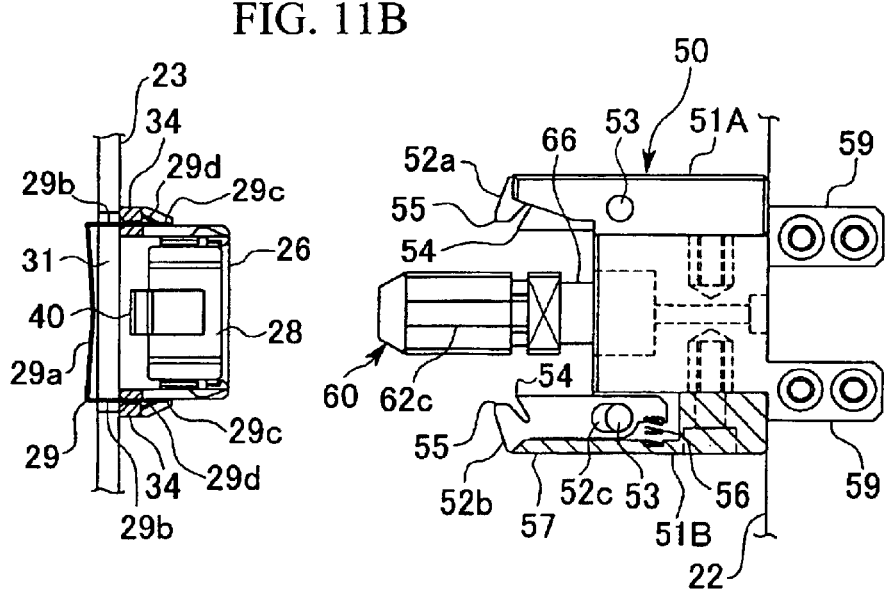
FIG. 11B is a partial side sectional view showing the state observed before the clip removing tool is pushed against the BH housing.
Figure 12A:
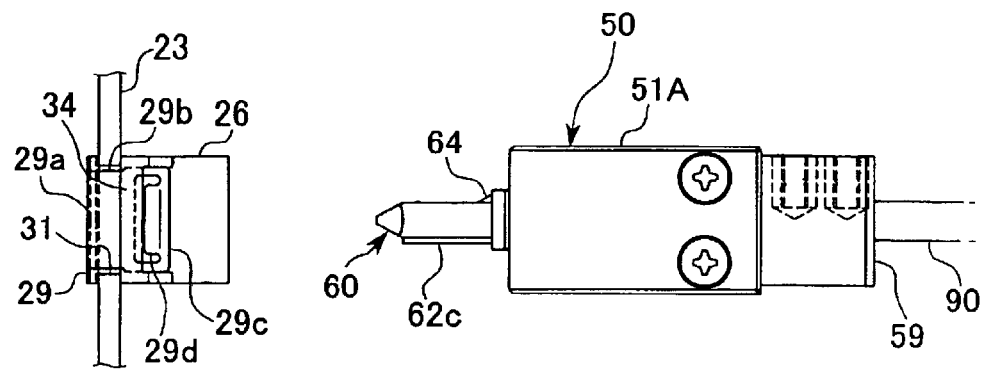
FIG. 12A is a plan view showing an example in which an operation lever is applied as an operation handle.
Figure 12B:
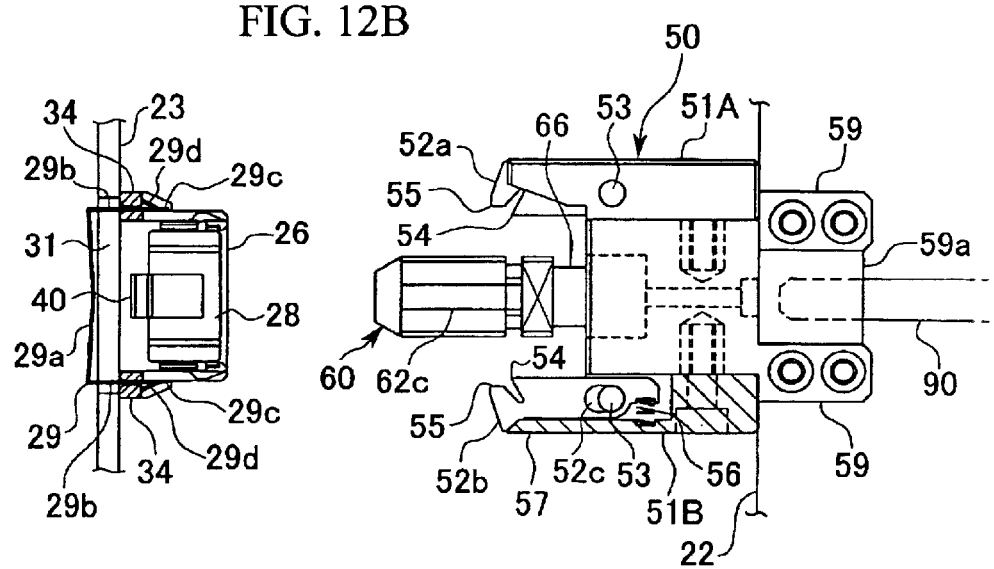
FIG. 12B is a partial side sectional view showing the example in which the operation lever is applied as an operation handle.
Figure 13A:
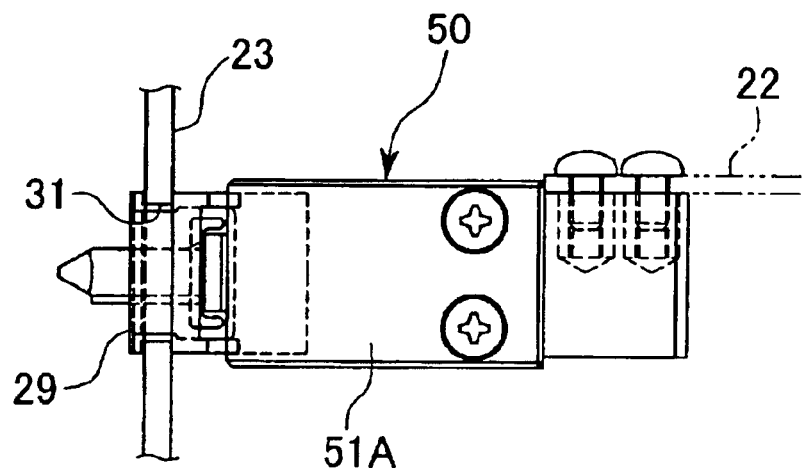
FIG. 13A is a plan view showing that the clip removing tool has been pushed against the BH housing.
Figure 13B:
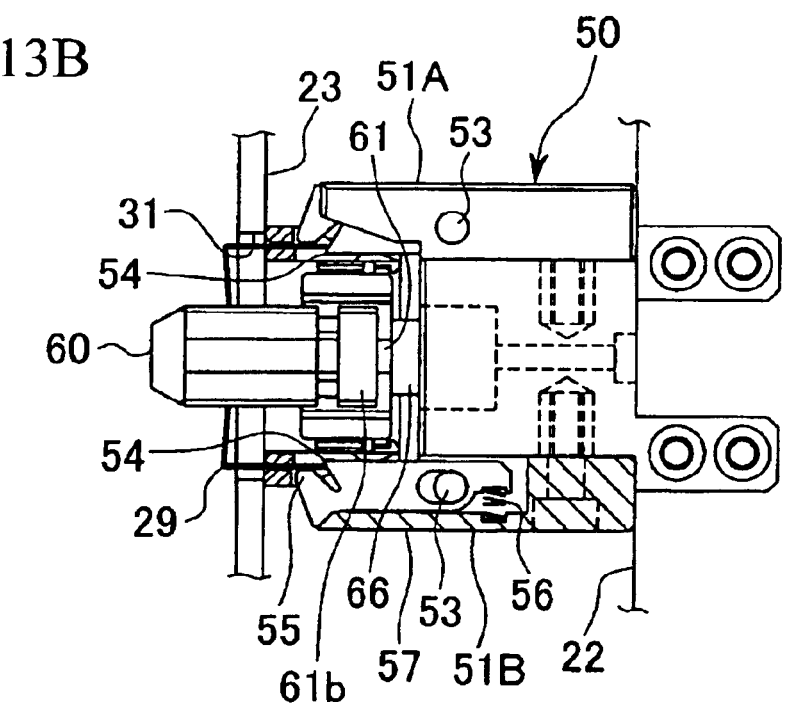
FIG. 13B is a partial side sectional view showing that the clip removing tool has been pushed against the BH housing.

Now, description will be given of a clip removing tool 50 (hereinafter simply referred to as a "removing tool 50") according to the present invention. FIG. 5 is a perspective view showing the removing tool 50. FIGS. 6A to 6D also show the removing tool 50. FIGS. 7A to 7D show a removing tool main body 51 constituting the removing tool 50. FIGS. 8A to 8D are part drawings showing a frame 58 of pawl blocks 51A and 51B constituting the removing tool 50. FIGS. 9A and 9B are part drawings showing disengaging pieces 52a and 52b attached to the frame 58. FIGS. 10A to 10D show the configuration of a holding engaging portion 60 provided in the removing tool 50. FIGS. 11A and 11B show a state observed before the removing tool 50 is pushed against the BH housing 26. FIGS. 12A and 12B show an example in which an operation lever 90 is applied as an operation handle. FIGS. 13A and 13B show that the removing tool 50 has been pushed against the BH housing 26.

In FIGS. 6A to 6D and 11A and 11B, the clip removing tool 50 is composed of a removing tool main body 51 advanced toward or retreated from the BH housing 26, and a pair of pawl blocks 51A and 51B removably attached to the opposite sides of the removing tool main body 51. Specifically, the pawl blocks 51A and 51B are installed on and removed from the removing tool main body 51 using screws 91. The pawl blocks 51A and 51B are configured similarly but are attached to the removing tool main body 51 at the opposite positions.

The pawl blocks 51A and 51B are constructed by attaching the engaging pieces 52a and 52b, respectively, to the frame 58 (see FIGS. 8A to 8D), made of hard resin, metal, or the like, so that the engaging pieces 52a and 52b are rotatably supported by a shaft 53. The disengaging pieces 52a and 52b are attached so that their leading end portion opposite to their proximal end attached pivotally to the shaft 53 extends to the front of the removing tool 50 in a direction in which the removing tool 50 is pushed against the BH housing 26 (the left of FIGS. 6A, 6C, 6D, and 11; this direction will hereinafter sometimes be referred to as "front", whereas the opposite direction will hereinafter sometimes be referred to as "rear"). The pawl blocks 51A and 51B each have a stopper wall 57 protruding from the frame 58 beyond the shaft 53. The disengaging pieces 52a and 52b each have its leading end pushed against the stopper wall 57 from the opposite pawl block via the removing tool main body 51, by a spring 56 provided in each of the pawl blocks 51A and 51B. However, each of the disengaging pieces 52a and 52b can be displaced from the stopper wall 57 toward the opposite pawl block via the removing tool main body 51 within the expansion and contraction range of the spring 56. This makes the separation between the leading ends of the pair of disengaging pieces 52a and 52b variable. When the disengaging pieces 52a and 52b each abut against the stopper wall 57, the separation between the leading ends of the pair of disengaging pieces 52a and 52b is maximum.

When the removing tool 50 is pushed against the BH housing 26, both disengaging pieces 52a and 52b are pushed against the respective leading end portions 29c of the clip 29. Thus, the engaging pawls 29d are disengaged from the locking portions 34 of the BH housing 26.

The disengaging pieces 52a and 52b each have, at a leading end in a direction in which it projects from the pawl block 51A or 51B, respectively, an abutting portion 54 that abuts against the leading end portion 29c of the elastic pawl and an engaging pawl pushing portion 55 that pushes the engaging pawl 29d of the elastic pawl 29b. While the pair of disengaging pieces 52a and 52b are each abutting against the stopper wall 57, the distance between the engaging piece pushing portions 55 of the disengaging pieces 52a and 52b substantially equals the distance between the pair of engaging pieces 29d of the clip 29. Furthermore, the distance between the abutting portions 54 of the disengaging pieces 52a and 52b substantially equals the distance between the leading end portions 29a of the pair of elastic pawls of the clip 29. Accordingly, by pushing the removing tool 50 into the BH housing 26, the engaging piece pushing portions 55 of the disengaging pieces 52a and 52b can be pushed against the pair of engaging pieces 29d of the clip 29. Furthermore, the abutting portions 54 of the disengaging pieces 52a and 52b can be pushed against the leading end portions 29a of the pair of elastic pawls of the clip 29.

A holding engaging portion 60 projecting from the removing tool main body 51 and between the disengaging pieces 52a and 52b is elongated so as to be inserted into a plug slot 28a (see FIG. 21) penetrating an internal housing 28 incorporated in the BH housing 26. The holding engaging portion 60 has, on its side portion, a rising-and-sinking engaging piece 64 that can rise and sink freely, to provide the following function: by inserting the holding engaging portion 60 into the plug slot 28a and engaging the engaging piece 64 with the internal housing 28, the BH housing 26 from which the clip 29 has been removed can be held in the removing tool 50.

As shown in FIGS. 5, 6A to 6D, and 10A to 10D, the holding engaging portion 60 is constructed by assembling a plurality of parts on a central shaft 61. The configuration of the holding engaging portion 60 will be specifically described below.

A leading end portion (a side directed toward the front of the removing tool 50) of the central shaft 61 is housed in a cap-like (bottomed-cylinder-like) inserting cap 62. The inserting cap 62 can be pushed in along the axial direction of the central shaft 61 toward the proximal end of the central shaft 61, i.e. toward the removing tool main body 51. The inserting cap 62 can be pushed in toward the proximal end of the central shaft 62 within the range of expansion and contraction of a spring 65 housed in the clearance between the leading end of the central shaft 61 and a bottom surface of a internal space 62a of the inserting cap 62 which surface is located at the leading end portion of the cap (the left of FIGS. 10A, 10C, and 10D) (for the state in which the inserting cap 62 has been pushed in, see FIG. 20). Furthermore, after the push-in operation, the inserting cap 62 returns to the state shown in FIGS. 10A to 10D because of the urging force of the spring 65.

The rising-and-sinking engaging piece 64 is provided in a concave 61a opened in a side portion of the central shaft 61. It is supported by a shaft 63 provided in the concave 61a so as to be rotatable around an axis of rotation orthogonal to the axial direction of the central shaft 61. When the rising-and-sinking engaging piece 64 rotates around the shaft 63, an engaging leading end 64a rises from and sinks into the side portion of the central shaft 61, the engaging leading end 64a projecting from the proximal end of the rising-and-sinking engaging piece 64 which is pivotally attached to the shaft 63. A spring 61d provided in the concave 61a functions to push the engaging leading end 64a from the concave 61a to the side portion of the central shaft 61.

Figure 18A:
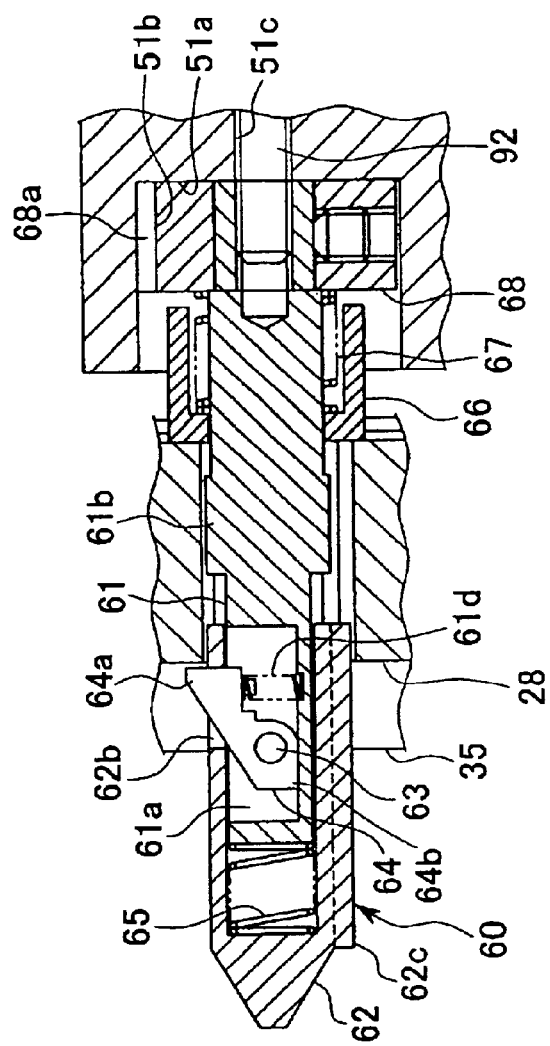
FIG. 18A is a horizontal sectional view showing that the rising-and-sinking engaging piece of the holding engaging portion inserted into the plug hole in the internal housing of the BH housing has slipped out of the plug hole toward the backplane and then engaged with the internal housing.

The concave 61a is housed in the inserting cap 62. A window 62b is opened in a side wall portion of the inserting cap 62. The concave 62b is large enough to allow the engaging leading end 64a of the rising-and-sinking engaging piece 64 to be inserted into the window. The engaging leading end 64a of the rising-and-sinking engaging piece 64 projects from the side portion of the inserting cap 62 through the window 62b, which is in communication with the opening of the concave 61a. In this case, the rising-and-sinking engaging piece 64 also functions to prevent the inserting cap 62 from slipping out toward the leading end of the central shaft 61. That is, a stopper portion 64b projecting from the rising-and-sinking engaging portion 64 abuts against an inner surface of the concave 61a to regulate such rotation of the rising-and-sinking engaging piece 64 (counterclockwise rotation in FIG. 10A) as the engaging leading end 64a moves toward the leading end of the holding engaging portion 60. Accordingly, the location at which the rear-end-side (the right of FIG. 18A) inner surface of the window 62b of the inserting cap 62 abuts against the rising-and-sinking engaging piece 64 (specifically, the engaging leading end 64a) constitutes a limit on movement of the inserting cap 62 toward the leading end of the holding engaging portion 60.

In FIG. 10A and others, the stopper portion 64b is illustrated projecting from the proximal end of the rising-and-sinking engaging piece 64 so as to extend toward the leading end of the holding engaging portion 60 relative to the shaft 63, constituting the center of rotation of the rising-and-sinking engaging piece 64. However, the stopper portion formed in the rising-and-sinking engaging piece is not limited to this aspect. Various configurations are available provided that the stopper portion abuts against the inner surface of the concave 61a to regulate such rotation of the rising-and-sinking engaging piece as moves the engaging leading end toward the leading end of the holding engaging portion 60.

Figure 20:
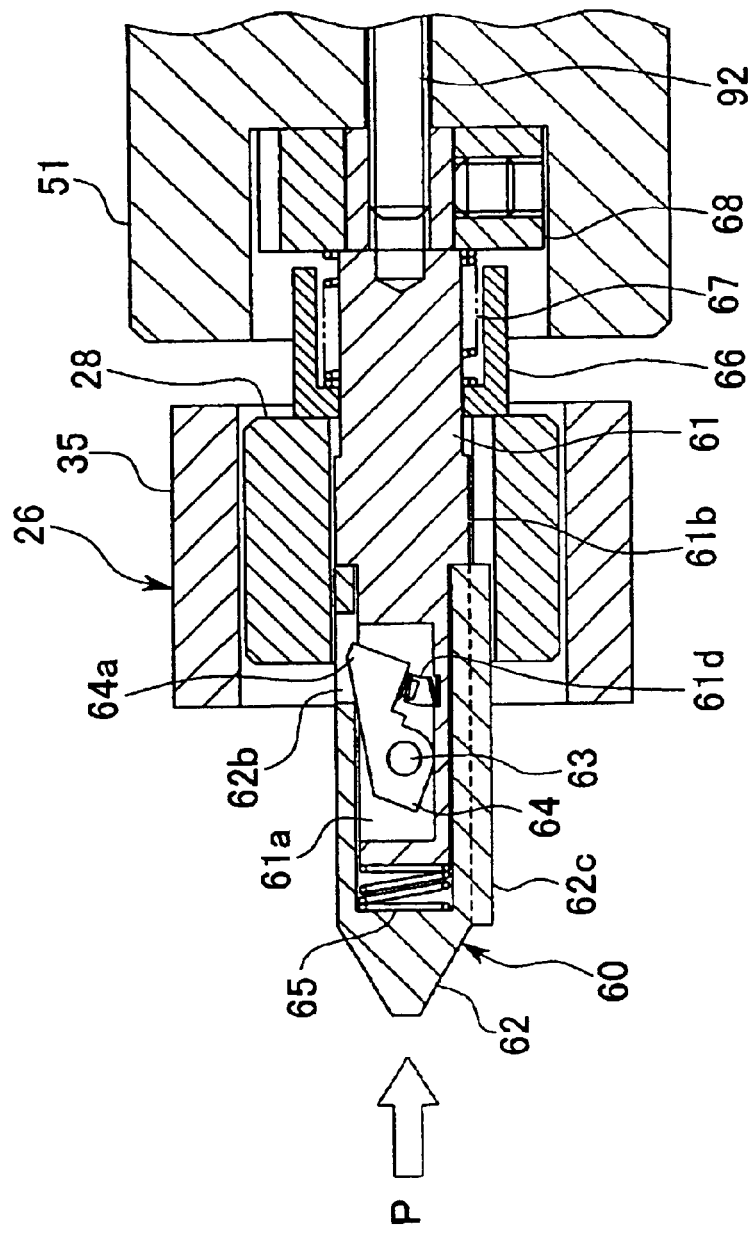
FIG. 20 is a horizontal sectional view showing that after the state shown in FIG. 18, the inserting cap of the holding engaging portion has been pushed into a proximal end of the holding engaging portion to disengage the rising-and-sinking engaging piece from the internal housing.

As shown in FIG. 20, the inserting cap 62 is pushed in toward the rear of the removing tool 50 relative to the central shaft 61 while pushing and contracting the spring 65. Then, the engaging leading end 64a is pushed in toward the rear of the removing tool 50 by the inner surface of the window 62b located at the front end of the removing tool 50. At the same time, the engaging leading end 64a is pushed into the concave 61a while rotating the rising-and-sinking engaging piece 64 to elastically deform the spring 61d (in this case, the spring 61d is pushed and contracted between the engaging leading end 64a and the inner wall surface of the concave 61a).

When the pushing force directed toward the rear of the removing tool 50 relative to the central shaft 61 of the inserting cap 62 is cleared, the inserting cap 62 is pushed back toward the front of the removing tool 50 along the central shaft 61 because of the urging force of the spring 65 as shown in FIG. 10A. Then, when the engaging leading end 64a of the rising-and-sinking engaging piece 64 can enter the window 62b, the urging force of the spring 61d causes the engaging leading end 64a of the rising-and-sinking engaging piece 64 to enter the window 62b and then project out from the window 62b.

That is, with the holding engaging portion 60, moving the inserting cap 62 along the axial direction of the central shaft 61 allows the rising-and-sinking engaging portion 60 to rise from or sink into the window 62b, formed in the side portion of the inserting cap 62.

The central shaft 61 has, at its proximal end opposite to the leading end, a pushing member 66 provided outside the central shaft 61 so as to be movable along the axial direction of the central shaft 61 and a spring 67 interposed between a pressure receiving portion provided in the central shaft 61 and the pushing member 66, so as to expand and contract freely along the central shaft 61.

The holding engaging portion 60 projects from the removing tool main body 51 when an inserted and fixed portion 68 provided on the proximal end of the central shaft 61 is inserted into and fixed to the removing tool main body 51.

Figure 6C:
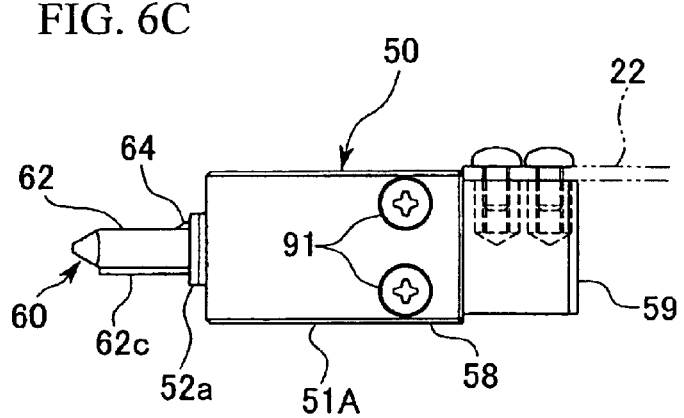
FIG. 6C is a top view showing the clip removing tool in FIG. 5.
Figure 6B:
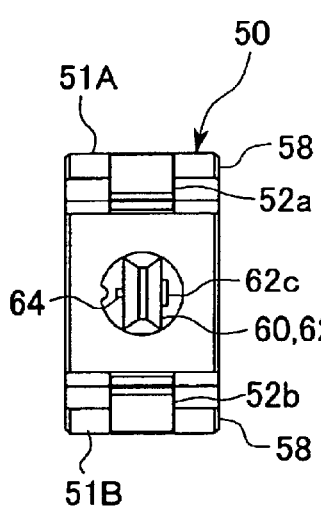
FIG. 6B is a side view showing the clip removing tool in FIG. 5 as viewed from its front (left side of FIG. 6A) in a direction in which it is pushed against the BH housing.
Figure 6A:
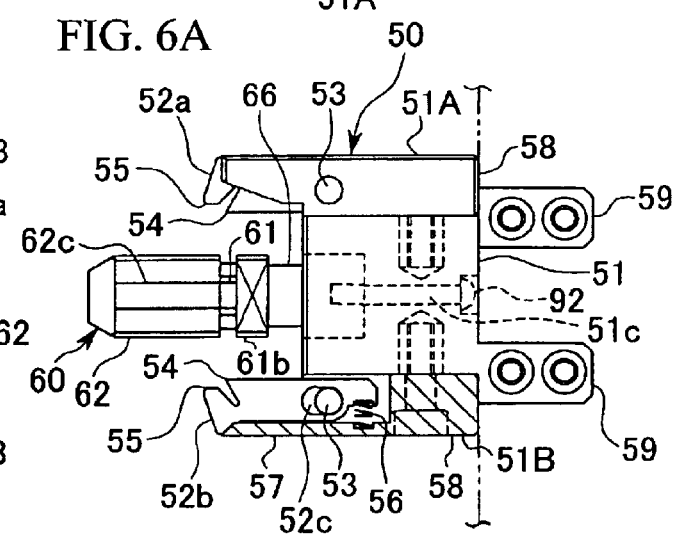
FIG. 6A is a partial side sectional view showing the clip removing tool in FIG. 5.
Figure 6D:
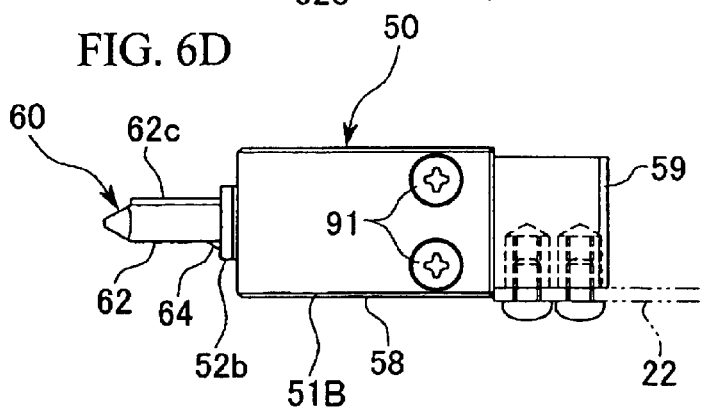
FIG. 6D is a bottom view showing the clip removing tool in FIG. 5.
Figure 8A:
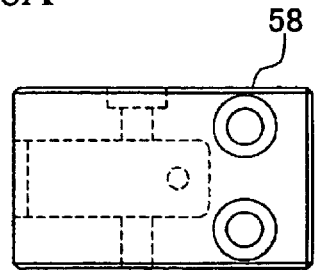
FIG. 8A is a plan view showing a frame of a pawl block constituting the clip removing tool in FIG. 5.
Figure 8D:
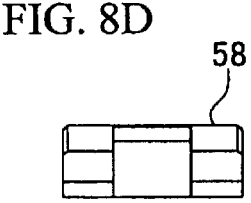
FIG. 8D is a side view showing the frame of the pawl block constituting the clip removing tool in FIG. 5, as viewed from its front.
Figure 8B:
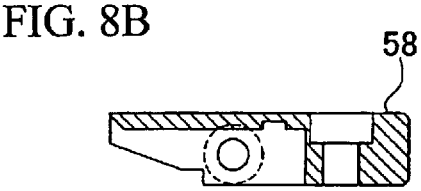
FIG. 8B is a sectional view showing the frame of the pawl block constituting the clip removing tool in FIG. 5.
Figure 8C:
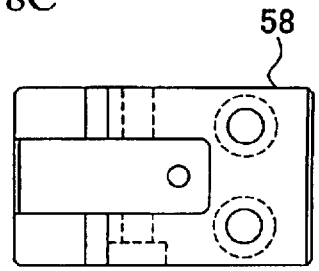
FIG. 8C is a sectional view showing the frame of the pawl block constituting the clip removing tool in FIG. 5, as viewed from its side attached to the removing tool main body.

Specifically, the inserted and fixed portion 68 is a fixed ring inserted/fixed to the outside of the central shaft 61 (the inserted and fixed portion will hereinafter be sometimes referred to as a "fixed ring"). To attach the holding engaging portion so that it cannot be pulled out, the fixed ring 68 is first fitted and housed in a fixing hole 51a opened in a front surface of the removing tool main body 51 in a direction in which the removing tool main body 51 is pushed, the fixing hole 51a extending toward the rear of the removing tool main body 51. Then, the fixed ring 68 is fixed to the removing tool main body 51 using fixing means such as a screw 92. Specifically, as shown in FIG. 6A, to fix the holding engaging portion 60 so that it cannot be pulled out from the removing tool main body 51, the screw 92 is screwed into a threaded hole 61e formed at the rear end of the central shaft 61, the screw 92 being inserted into a hole 51c (see FIGS. 7A, 7C, and 7D) from the rear surface of the removing tool main body 51, the hole 51c being formed in the rear surface so as to lead to the fixing hole 51a and penetrate the removing tool main body 51. Removing the screw 92 allows the holding engaging portion 60 to be separated from the removing tool main body 51. Furthermore, the orientation of the holding engaging portion 60 around the central shaft 61 is determined depending on the engagement between a key groove 68a (see FIGS. 10A to 10C) formed in a side portion of the fixed ring 68 and a key 51b projecting from an inner surface of the fixing hole 51a.

The key and key groove, which determine the fixing orientation of the holding engaging portion 60 to the removing tool main body 51, may be formed on the fixed ring 68 and in the fixing hole 51a in the removing tool main body 51, respectively.

The fixed ring 68 also functions as the pressure receiving portion for the spring 67. That is, the spring 67 is interposed between the fixed ring 68 as the pressure receiving portion and the pushing member 66, arranged in front of the fixed ring 68. When the spring 67 is pushed and contracted as the pushing member 66 is pushed in backward along the central shaft 61, it receives reaction force from the fixed ring 68 to urge the pushing member 66 forward.

Specifically, the pushing member 66 is a ring inserted around the central shaft 61. The pushing member 66 is restrained from moving forward from the position at which it abuts against a fixing block portion 61b extending from an axially central portion to opposite sides of the central shaft 61. Furthermore, the pushing member 66 is pushed against the fixing block portion 61b by the urging force of the spring 67.

A pair of slide bars 69a and 69b extending at the respective sides of and along the central shaft 61 are fixed to the fixing block portion 61b, formed in the axially central portion of the central shaft 61. The slide bars 69a and 69b extend forward from the fixing block portion 61b. The leading end of the central shaft 61 and the leading end of the slide bars 69a and 69b, arranged side by side at the respective sides of the central shaft 61, are housed in the inserting cap 62. The inserting cap 62 can freely slide forward and backward along the longitudinal direction (extending direction) of the two slide bars 69a and 69b. This accomplishes stable support and smooth movement.

The fixing block portion 61b functions as both a fixing portion for the slide bars 69a and 69b and a stopper that sets a limit on forward movement of the pushing member 66. However, it should be appreciated that a different configuration can be employed which provides the function of the fixing block portion 61b as a fixing portion for the slide bars 69a and 69b and its function as a stopper that sets a limit on forward movement of the pushing member 66, using separate members or the like.

The fixing block portion 61b is an extended portion projecting from the central shaft 61. However, the fixing block portion 61b is not limited to this aspect, and a different configuration can be employed, and for example, a configuration in which the fixing block portion 61b is composed of a separate part fixed to the outside of the central shaft 61.

FIGS. 11A and 11B show an example in which the printed board 22 is attached to the removing tool main body 51 as an operation handle. FIGS. 13A and 13B show an example in which a rod-like operation lever 90 is attached to the removing tool main body 51 as an operation handle.

As shown in FIGS. 11A and 11B, the printed board 22 is screwed and fixed to a side portion of an attachment 59 projecting from a rear portion of the removing tool main body 51.

As shown in FIGS. 13A and 13B, the operation lever 90 is inserted and screwed into a screw hole opened in a rear surface (the right of FIGS. 13A and 13B) of a block-like attachment 59a fixed to the rear surface of the removing tool main body 51. Thus, the operation lever 90 is fixed to the removing tool main body 51 via the attachment 59a.

Using these operation handle 22 or 90 enables the efficient performance of operations such as pushing the clip removing tool 50 against the BH housing 26 mounted on the backplane 23 located deeply inside the plug-in unit 21 or drawing the clip removing tool 50 out from the plug-in unit 21.

If the printed board 22 is attached as an operation handle, then simply by pushing and inserting the printed board 22 into the plug-in unit 21, the removing tool 50 can be advantageously pushed against the BH housing 26 while accurately positioning the removing tool 50 on the BH housing 26 with an alignment accuracy of the printed board 22 to the plug-in unit 21. Furthermore, the clip 29 can be efficiently removed from the BH housing 26.

FIGS. 21 to 23A and 23B show a specific example of the BH housing 26.

In FIGS. 21 to 23A and 23B, the BH housing 26 is configured to house and hold only one optical connector plug 24b as an MPO plug. The BH housing 26, in combination with the PH housing 25, shown in FIG. 1, constitutes a BP connector that connects the optical connector plugs 24a and 24b, MPO plugs, together in a one-to-one correspondence. When the PH housing 25 is fitted into the BH housing 26 to constitute an optical connector adapter 27, an optical connector plug 25a inserted into the PH housing 25 for engagement and retention is connected to the optical connector plug 24b inserted into the BH housing 26 for engagement and retention.

The BP housing 26 is composed of a prismatic housing main body 35 and an internal housing 28 housed in an internal space 36 penetrating the housing main body 35 by inserting it into the internal space 36 from a surface 37 abutting against the backplane 23. The internal housing 28 is shaped like a sleeve through which a plug hole 28a is penetrated. The internal housing 28 is, for example, entirely formed of synthetic resin such as plastics.

Figure 21:
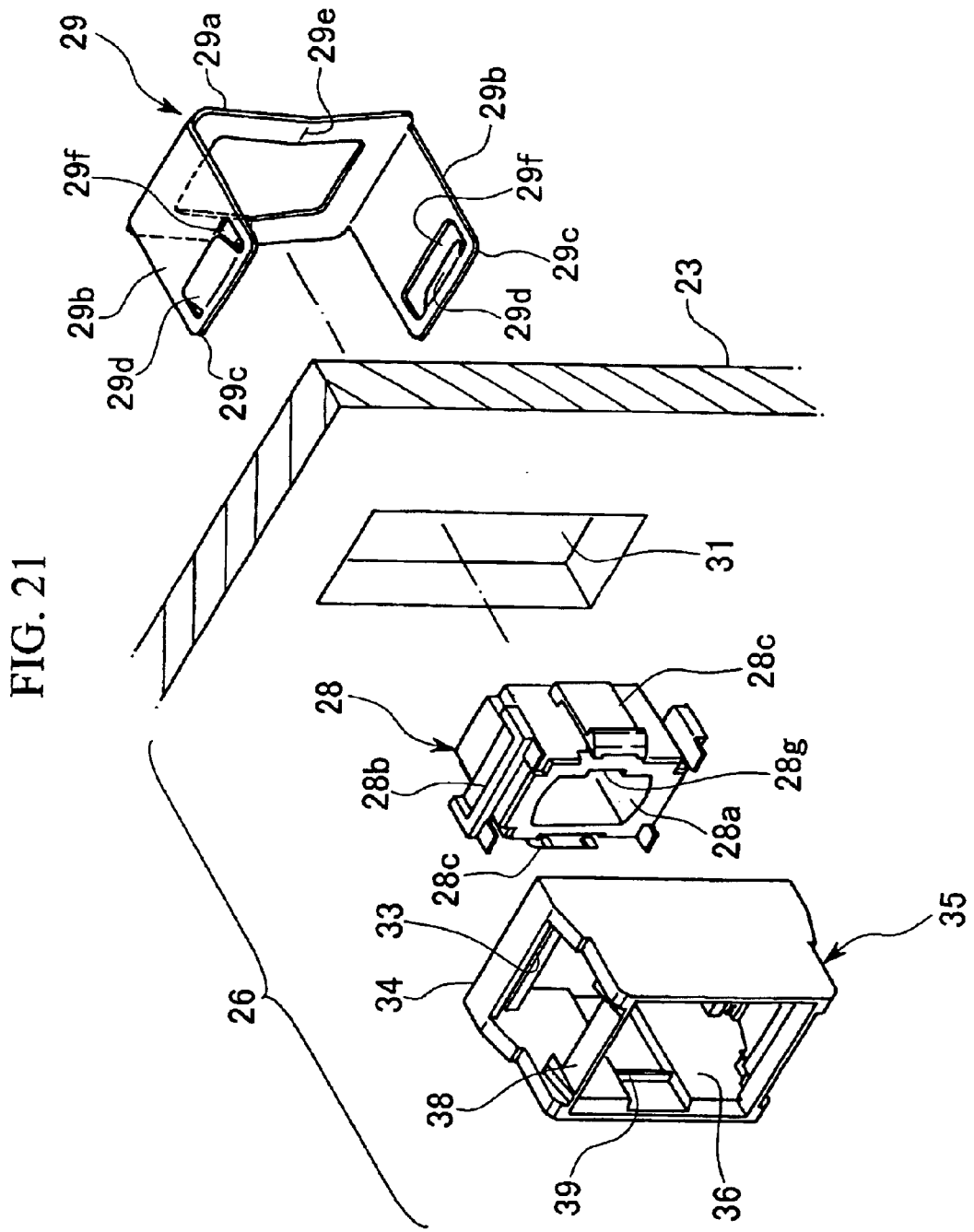
FIG. 21 is an exploded perspective view showing a specific example of the BH housing of the backplane connector in FIG. 1.
Figure 22:
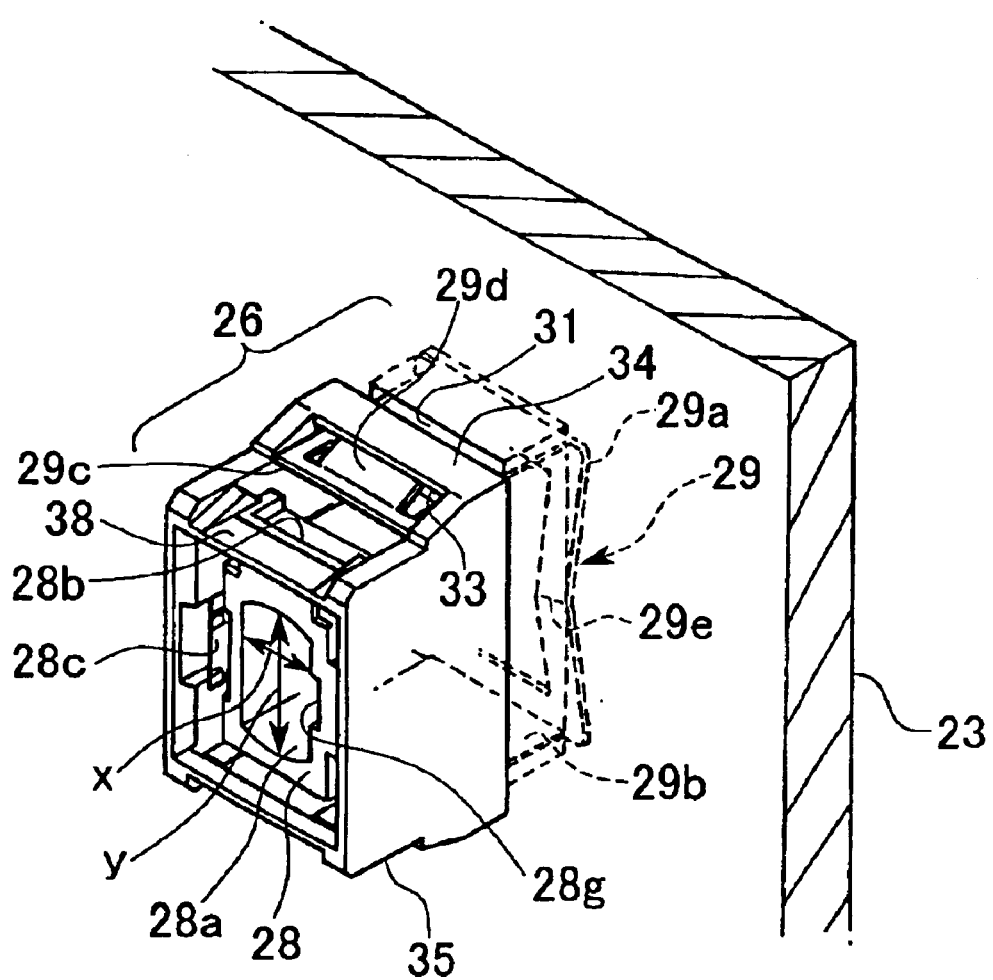
FIG. 22 is a perspective view showing how the BH housing in FIG. 21 is assembled.
Figure 23A:
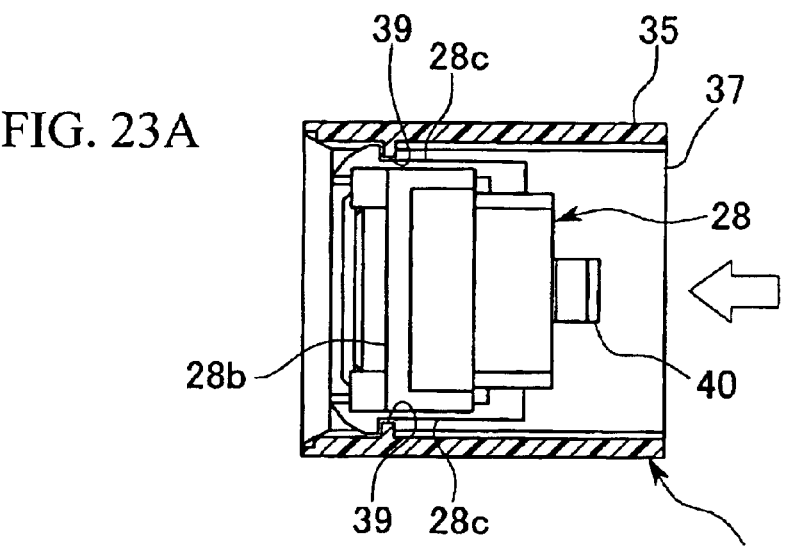
FIG. 23A is a horizontal sectional view showing the internal housing of the BH housing in FIG. 21 and also showing how components are housed in the housing main body.

The BH housing 26 is assembled (FIGS. 22 and 23A show how it is assembled) by housing the internal housing 28 in the housing main body 35. The internal housing 28 inserted into the internal space 36 of the BH housing 26 from the abutting surface 37 abuts abutting pieces 28b projecting from the vertically opposite side portions (the vertical direction in FIGS. 21 and 22) of the housing 28, against corresponding stopper walls 38 provided in the PH housing 25 so as to lie opposite the abutting surfaces 37 in the housing main body 35. The internal housing 28 also engages holding engaging pawls 28c projecting from laterally opposite sides (from upper left to the lower right of FIGS. 21 and 22 and the vertical direction in FIG. 23A), with engaging projections 39 formed in laterally opposite sides of the internal space 36 of the housing main body 35. The stopper walls 38 serve to prevent the internal housing 28 from slipping out toward the PH housing 25. By engaging with the corresponding holding engaging pawls 28c, the engaging projections 39 serve to prevent the internal housing 28 from slipping out toward the backplane 23. This allows the internal housing 28 to be housed and held at a predetermined position in the housing main body 35 of the BH housing 26.

A pawl inserting slot 33 is formed like a slit penetrating the projecting proximal end of a locking portion 34 projecting from each of the vertically opposite side portions of the housing main body 35. By pushing in the leading end portion 29c of the elastic pawl from the abutting surface 37 side, the engaging pawl 29d can be passed through the pawl inserting slot 33 in such a manner that the elastically deformed engaging pawl 29d is pushed into a slot 29f (see FIG. 21) in the leading end portion 29c of the elastic pawl. The engaging pawl 29d passed through the pawl inserting slot 33 returns to its original projecting state owing to its own elasticity. The engaging pawl 29d is then opened from the elastic pawl 28b so as to project out from the BH housing 26. The engaging pawl 29d then engages with the engaging portion 34 as shown in FIG. 4. The engaging pawl 29d with which the locking portion 34 has been engaged is exposed so as to face the PH housing 25. As described later, when the clip removing tool 50 is continuously pushed against the BH housing 26, the engaging pawl pushing portions 55 of disengaging pieces 52a and 52b of the clip removing tool 50 push the corresponding engaging pawls 29d from the outside of the BH housing 26 to reduce the amount of part of each engaging pawl 29d which projects from the elastic pawl 29b. Thus, the engaging pawl 29d is disengaged from the locking portion 34. This allows the clip 29 to be removed easily.

Figure 23B:
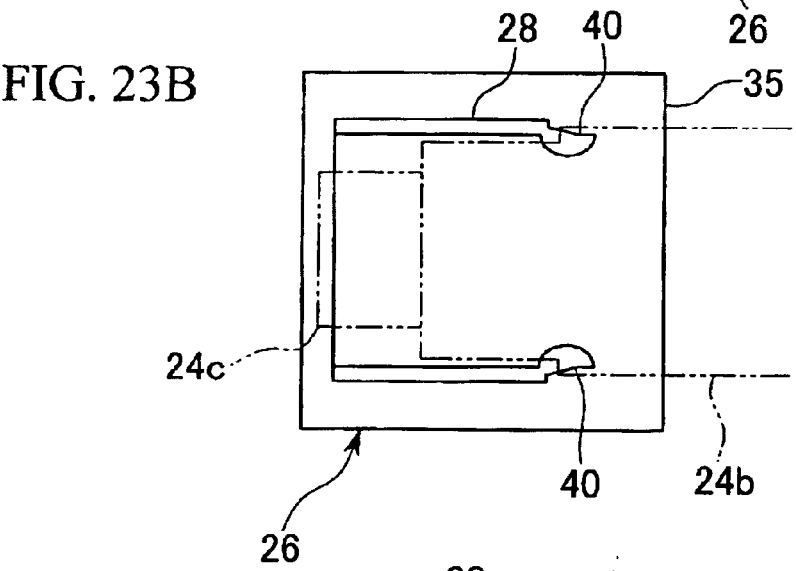
FIG. 23B is a side view showing the internal housing of the BH housing in FIG. 21 and also showing how connector holding pawls engage with an optical connector plug.

As shown in FIG. 23B, a pair of connector holding pawls 40 project from opposite sides of the plug slot 28a in the internal housing 28. The connector holding pawls 40 are elastic pawls that hold optical connector plug 24b by removably engaging with engaging concaves (not shown) provided on opposite side portions of the optical connector plug 24b inserted from the backplane 23.

As shown in FIGS. 21, 22, and 23A and 23B, the internal housing 28 of the BH housing 26, which holds the MPO plug, the optical connector plug 24b, is provided with the plug slot 28a the shape of which coincides with the outer shape of the MPO plug. The key groove 28g, the shape of which is obtained by extending one side portion of the plug slot 28a in the direction x of its minor axis (see FIG. 22), i.e., the lateral direction of the plug slot 28a, enables the optical connector plug 24b to be inserted into the plug slot 28a only in a predetermined orientation. The connector holding pawls 40 are arranged on the opposite sides of the plug slot 28a in the direction y of its major axis, i.e., on the opposite sides in the vertical direction. The connector holding pawls 40 are formed at positions different from those at which the holding engaging pawls 28c are formed with respect to the housing main body 35 of the internal housing 28.

Now, with reference to FIGS. 11 to 20 and others, description will be given of a clip removing method using the removing tool 50. The removing tool 50 also functions as a holding tool that holds the optical connector (BH housing 26) in the clip removing method.

FIG. 11 shows a state observed before the removing tool 50 is pushed against the BH housing 26. Then, the removing tool 50 is inserted deeply into the plug-in unit 21 (to a position closer to the backplane 23) so as to be pushed against the BH housing 26. Thus, first, the holding engaging portion 60 projected forward from the pair of disengaging pieces 52a and 52b is inserted into the plug slot 28a in the internal housing 28 of the BH housing 26. Then, the engaging pawl pushing portions 55 of the pair of disengaging pieces 52a and 52b are pushed against the engaging pawls 29d of the pair of elastic pawls 29b of the clip 29.

The inserting cap 62, located at the leading end of the holding engaging portion 60, has a sectional shape substantially matching that of the plug slot 28a. The holding engaging portion 60 is fixed to the removing tool main body 51 in the orientation in which the inserting cap 62 can be inserted into the plug slot 28a, i.e., in the orientation in which a key 62c projecting from a side portion of the inserting cap 62 is inserted into the key groove 29g in the plug slot 28a. The holding engaging portion 60 is inserted into the plug slot 28a before the disengaging pawls 52a and 52b abut against the corresponding elastic pawls 29b. This allows the removing tool 50 to be positioned on the BH housing 26. As a result, the removing tool 50 can be pushed against the BH housing 26 in the correct orientation. Furthermore, the disengaging pawls 52a and 52b can be abutted and pushed precisely against the corresponding elastic pawls 29b.

Figure 23C:
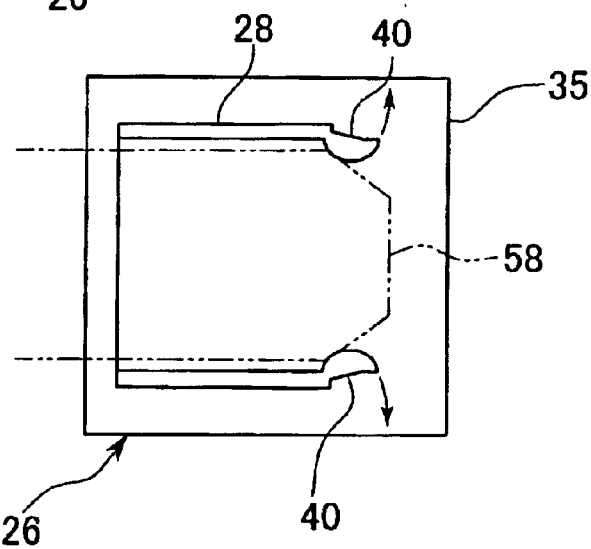
FIG. 23C is a side view showing the internal housing of the BH housing in FIG. 21 and also showing how the holding engaging portion of the clip removing tool in FIG. 6 engages with the connector holding pawls.

As shown in FIG. 23C, an inserting operation allows the leading end of the holding engaging portion 60 to be inserted into the internal housing 28 so as to push aside the opposite connector holding pawls 40 of the internal housing 28. The leading end of the holding engaging portion 60 then projects from the backplane 23 side of the internal housing 28, i.e., from the attaching slot 31. The leading end of the holding engaging portion 60 is tapered. This allows the pair of connector holding pawls 40 to be smoothly pushed aside and allows the leading end of the holding engaging portion 60 to be smoothly inserted into the plug slot 28a.

Figure 17:
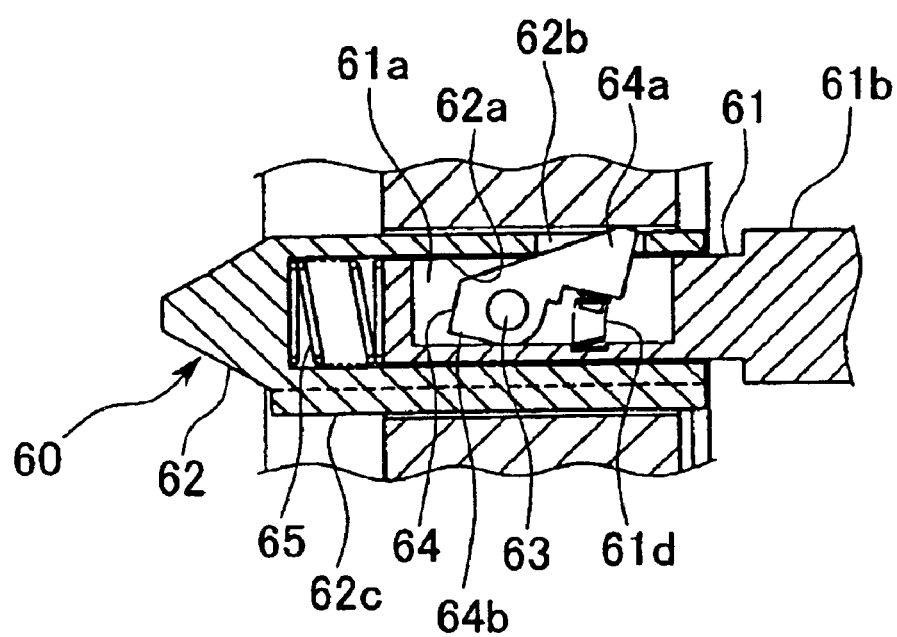
FIG. 17 is a diagram showing that a rising-and-sinking engaging piece of the holding engaging portion inserted into a plug hole in an internal housing of the BH housing is located in the plug hole.
Figure 18B:
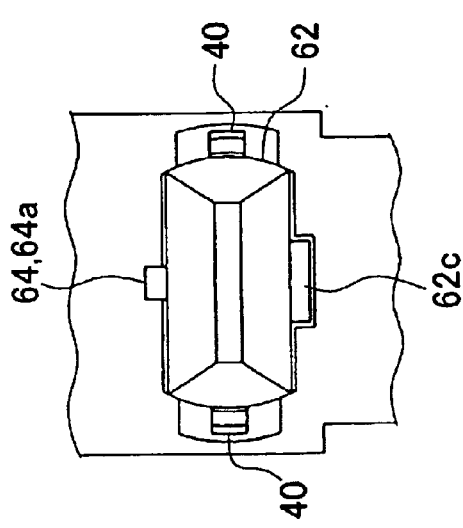
FIG. 18B is a side view showing that the rising-and-sinking engaging piece of the holding engaging portion inserted into a plug hole in an internal housing of the BH housing has slipped out of the plug hole toward the backplane and then engaged with the internal housing, as viewed from the leading end of the holding engaging portion.

The rising-and-sinking engaging piece 64 projecting out from the window 62b in the inserting cap 62 has such an angular shape that the amount of part of it which projects from the inserting cap 62 increases from front to rear of the engaging piece. Consequently, as the inserting cap 62 is inserted into the plug slot 28a, it abuts against the internal housing 28 around the opening end of the plug hole 28a and is thus pushed gradually into the concavity 61. The inserting cap 62 thus enters the plug slot 28a. Then, as shown in FIG. 17, the holding engaging portion 60 is inserted into the plug slot 28a in such a way that the rising-and-sinking engaging piece 64 projecting out from the window 62b in the inserting cap 62 abuts against the inner wall of the plug slot 28a and is thus pushed into the concavity 61a. The rising-and-sinking engaging piece 64 slidably moves on the inner wall of the plug slot 28 as the holding engaging portion 60 is pushed into the plug slot 28, while remaining pushed against the inner wall surface of the plug slot 28a owing to the urging force of the spring 61d incorporated in the concavity 61a. As shown in FIG. 18, when the rising-and-sinking engaging piece 64 slips out of the backplane 23-side end of the plug slot 28a, it projects out from the window 62b in the inserting cap 62. Consequently, the rising-and-sinking engaging piece 64 can be engaged with the internal housing 28.

In this regard, before the rising-and sinking engaging piece 64 slips out of the back plane 23-side of the plug slot 28a and projects out from the window 62b in the inserting cap 62 for engagement with the internal housing 28, the holding engaging portion 60 is inserted into the plug slot 28a to push the pushing member 66 of the holding engaging portion 60 against the internal housing 28. The pushing member 66 is thus relatively retreated to start pushing and contracting the spring 67. Furthermore, it becomes possible for the rising-and-sinking engaging piece 64 to engage with the internal housing 28 before the clip 29 is disengaged from the BH housing 26 using the removing tool 50, specifically, before the pair of disengaging pieces 52a and 52b disengage the engaging pawls 29d of the clip 29 from the corresponding locking portions 34 of the BH housing 26.

The pushing member 66 is shaped so as not to enter the plug slot 28a but to abut against the internal housing 28 when the holding engaging portion 60 is inserted into the plug slot 28a.

Figure 14:
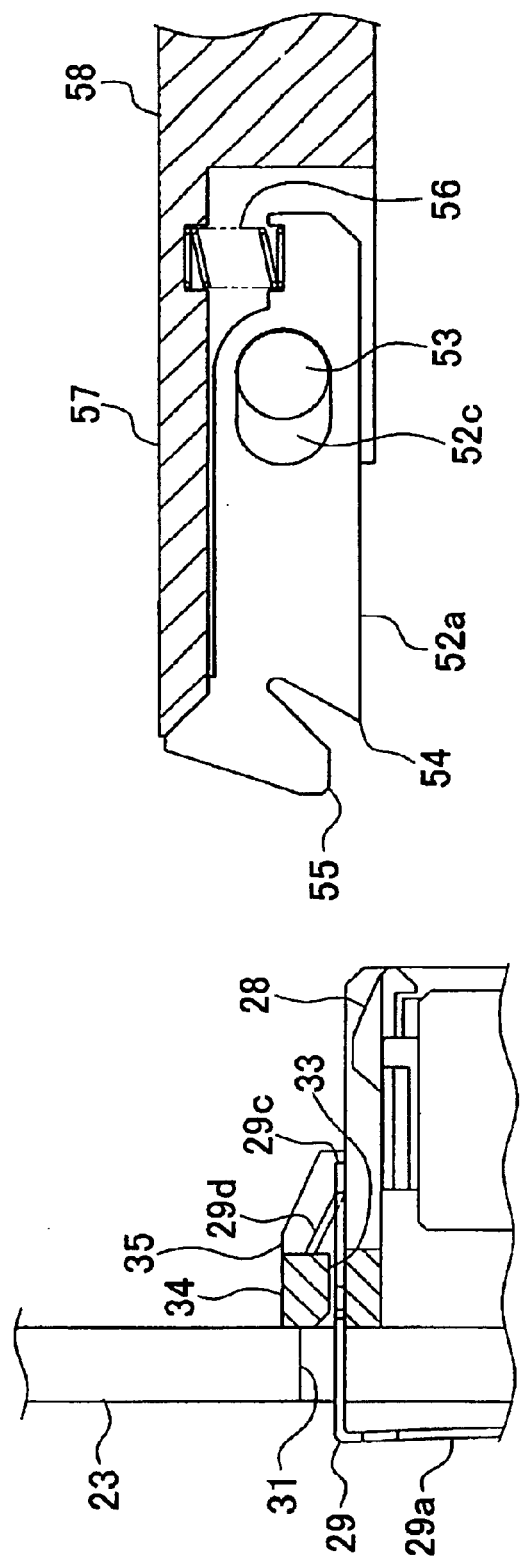
FIG. 14 is a diagram showing a disengaging piece of the clip removing tool in FIG. 5.
Figure 15:
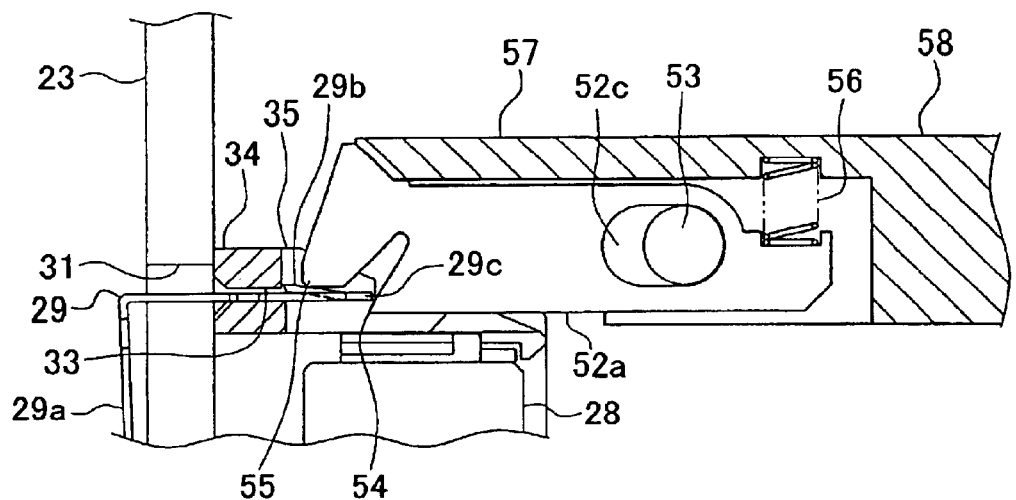
FIG. 15 is a diagram showing the disengaging piece of the clip removing tool in FIG. 5 and also showing that an abutting portion is pushed against an engaging pawl of the clip to push it down.
Figure 16:
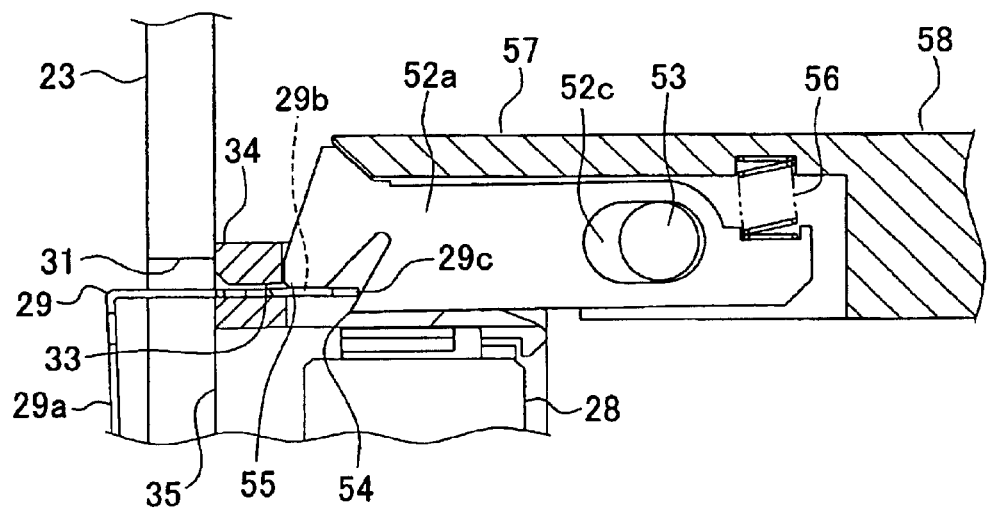
FIG. 16 is a diagram showing the disengaging piece of the clip removing tool in FIG. 5 and also showing that the abutting portion is abutted against an elastic pawl leading end portion of the clip.

FIGS. 14 to 16 shows the neighborhood of one 52a of the disengaging pieces. Although FIG. 15 shows one of the disengaging pieces, the pair of disengaging pieces 52a and 52b have similar shapes and attached to the clip removing tool 50 in the opposite directions. Furthermore, the pair of disengaging pieces 52a and 52b act similarly on the pair of elastic pawls 29b to substantially simultaneously disengage them from the locking portions 34.

FIG. 14 shows a state observed before the disengaging pieces 52a and 52b are pushed against the pair of elastic pieces 29b of the clip 29. The removing tool 50 is pushed against the BH housing 26. Then, as shown in FIG. 15, first, the engaging pawl pushing portions 55 of the disengaging pieces 52a and 52b abut against the corresponding engaging pawls 29d of the pair of elastic pawls 29b of the clip 29. As the removing tool 50 is further pushed against the BH housing 26, the engaging pawl pushing portions 55 slidably moves toward the back plane 23 while remaining in substantial sliding contact with the outer surfaces (the surfaces from which the engaging pawls 29d are raised) of the corresponding elastic pawls 29b. The engaging pawl pushing portions 55 push the corresponding engaging pawls 29d so as to preclude them from projecting from the corresponding elastic pawls 29b. That is, after the engaging pawls 29d, formed by folding a part of the elastic pawls 29b so as to raise them, have been raised, the engaging pawl pushing portions 55 push the engaging pawls 29d into the corresponding slots 29f in the elastic pawl leading ends 29c so as to push the engaging pawls down. In this case, the disengaging pieces 52a and 52b abut against the stopper walls 57 formed in the frames 58 of the pawl blocks 51A and 51B, respectively, to prevent an increase in distance between the leading ends of the pair of disengaging pieces 52a and 52b, respectively. Accordingly, the engaging pawl pushing portions 55 reliably push in the corresponding engaging pawls 29d. Thus, the engaging pawls 29d are disengaged from the corresponding locking portions 34 of the housing main body 35 of the BH housing 26.

The disengaging pieces 52a and 52b are pushed against the corresponding stopper walls 57 because of the urging force of the spring 61d, provided between the frames 58 of the pawl blocks 51A and 51B. Thus, with the distance between the leading ends of the pair of disengaging pieces 52a and 52b maintained stably, the disengaging pieces 52a and 52b (specifically, the engaging pawl pushing portions 55) can be pushed against the corresponding engaging pawls 29d of the pair of elastic pawls 29b. Therefore, the disengaging pieces 52a and 52b can be pushed against the corresponding engaging pawls 29d.

Then, as the removing tool 50 is further pushed against the BH housing 26, the abutting portions 54 abut against the corresponding elastic pawl leading ends 29c to push the leading ends 29c. Accordingly, as shown in FIG. 16, the elastic pawls 29b are pushed into the corresponding pawl inserting slots 33 in the housing main body 35. Thus, it becomes impossible to engage the engaging pawls 29d with the corresponding locking portions 34.

The disengaging pieces 52a and 52b are each supported on the removing tool main body 51 by inserting, over the shaft 53, a slot 52c formed to be extend along the extending direction of the disengaging pieces 52a and 52b. When the abutting portions 54 start pushing the corresponding elastic pawl leading end portions 29c, the disengaging pieces 52a and 52b, provided so that the longitudinal direction of the slot 52c coincides with the front-to-rear direction of the removing tool 50, are first pushed in toward the rear of the removing tool 50 within the extent of the slot 52c. In the disengaging pieces 52a or 52b, the position at which the abutting portion 54 abuts against the elastic pawl leading end portion 29c is closer to the opposite disengaging piece 52a or 52b, respectively, than to its shaft 53 (the center of rotation of the disengaging piece). By abutting the abutting portion 54 against the elastic pawl leading end portion 29c to push it, the disengaging pieces 52a and 52b are each rotated in the direction in which its leading end approaches the BH housing 26, i.e., in the direction in which the distance between the tips of the disengaging pieces 52a and 52b decreases about the shaft 53 with the disengaging pieces 52a and 52b resiliently deforming the spring 56. This causes the engaging pawl pushing portion 55 of each of the disengaging pieces 52a and 52b to reliably push the corresponding engaging pawl 29d into the slot 29f in the elastic pawl leading end portion 29c. Then, the abutting portion 54 pushes in the corresponding elastic pawl 29b against the backplane 23 to smoothly push the elastic pawl 29b into the pawl inserting slot 33 in the housing main body 35.

Once the engaging pawl 29d is pushed into the pawl inserting slot 33 in the housing main body 35, it can be pulled out easily from the BH housing 26 via the pawl inserting slot 33. Thus, the BH housing 26 and the clip 29 can be separated easily from each other.

In the clip 29, in which the main body portion 29e, which itself acts on the backplane 23 as a plate spring, the engaging pawls 29d are disengaged from the corresponding locking portions 34 of the BH housing 26. At the same time, the spring force of the main body portion 29e causes the elastic pawl leading end portions 29c to be pulled quickly and reliably into the corresponding pawl inserting slots 33. This reliably prevents inconveniences such as reengagement caused by the return of the disengaged engaging pawls 29d to the corresponding locking portions 34.

Figure 19A:
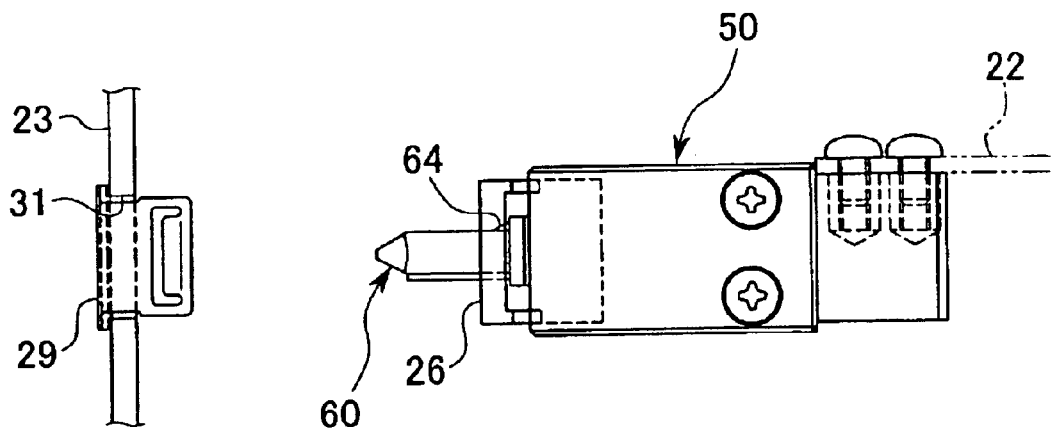
FIG. 19A is a plan view showing that the BH housing, from which the clip was removed using the clip removing tool in FIG. 5, has been taken out from a plug-in unit together with the clip removing tool.
Figure 19B:
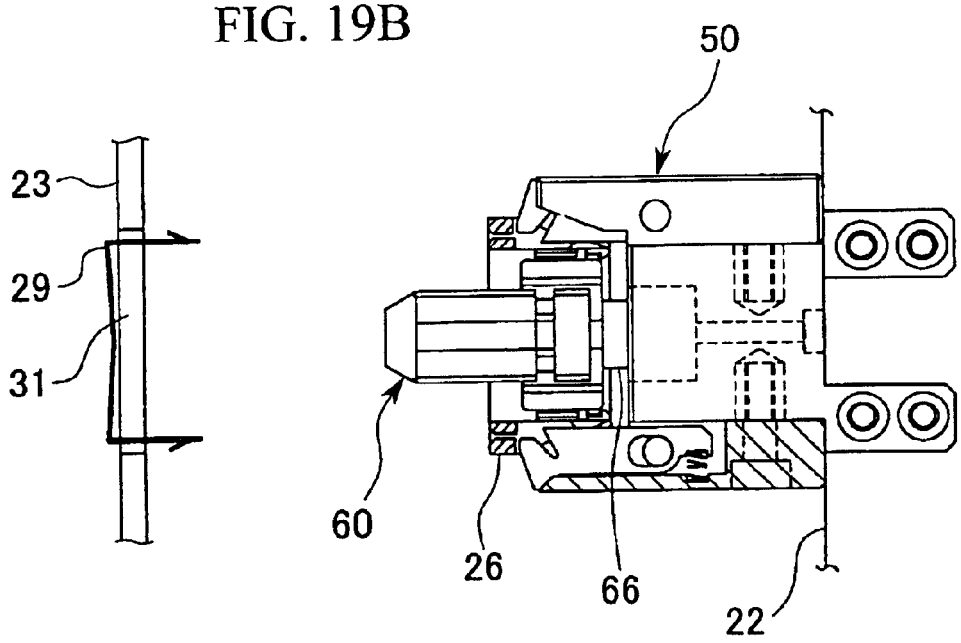
FIG. 19B is a partial side sectional view showing that the BH housing, from which the clip was removed using the clip removing tool in FIG. 5, has been taken out from a plug-in unit together with the clip removing tool.

With the clip removing tool 50, even when the engaging pawls 29d of the clip 29 are disengaged from the corresponding locking portions 34 of the BH housing 26, the BH housing 26 does not fall from the backplane 23 but remains in the clip removing tool 50 owing to the engagement of the holding engaging portion 60 (specifically, the rising-and-sinking engaging pieces 64) with the internal housing 28, incorporated in the BH housing 26. Accordingly, as shown in FIG. 19, when the clip removing tool 50 is pulled out from the plug-in unit 21 after the clip 29 has been removed, the BH housing 26 can be taken out from the plug-in unit 21 together with the clip removing tool 50. At this time, the clip removing tool 50 functions as a holding tool that holds the optical connector, the BH housing 26.

Specifically, after the disengagement of the engaging pawls 29d of the clip 29 from the locking portions 34 of the BH housing 26, when the removing tool 50 starts to be pulled out from the plug-in unit 21, the BH housing 26 is pulled out from the plug-in unit 21 together with the removing tool 50 with the urging force of the spring 67 keeping the internal housing 28 held between the pushing member 66 and the rising-and-sinking engaging piece 64. In this case, unwanted vibration of the BH housing 26 is prevented by the retention of the internal housing 28 between the pushing member 66 and the rising-and-sinking engaging pieces 64. This in turn prevents inconveniences such as catching of the BH housing 26 in any part of the plug-in unit 21, any optical fiber, or the like.

As the operation of removing the clip 29 progresses, the abutment between the abutting portions 54 of the disengaging pieces 52a and 52b of the removing tool 50 and the corresponding elastic pawls 29b of the clip 29 is cleared. Then, because of the urging force of the spring 56, the disengaging pieces 52a and 52b return to their state observed before they are pushed against the BH housing 26.

Furthermore, the removing tool 50 may start to be pulled out from the plug-in unit 21 after it has been pushed against the BH housing 26 up to a pushing limit, i.e., after the leading ends (specifically, the engaging pawl pushing portions 55) of the disengaging pieces 52a and 52b have abutted against the corresponding locking portions 34 of the housing main body 35 of the BH housing 26. This operation accomplishes a series of operations including disengagement of the engaging pawls 29d of the clip 29 from the corresponding locking portions 34 of the BH housing 26 and draw-out from the plug-in unit 21 of the BH housing 26 separated from the clip 29.

Once the BH housing 26 has been pulled out from the plug-in unit 21, the inserting cap 62, located at the leading end of the holding engaging portion 60, is pushed as arrow P in toward the rear of the removing tool 50, i.e., pushed in toward the removing tool main body 51 along the holding engaging portion 60 and relatively to the central shaft 61. Thus, the rising-and-sinking engaging pieces 64 are disengaged from the internal housing 28 to separate the BH housing 26 from the removing tool 50. In this case, when the inserting cap 62 is pushed in toward the removing tool main body 51 along the holding engaging portion 60 and relatively to the central axis 61, the side wall of the inserting cap 62 forming the inner surface of the front end (the leading end of the holding engaging portion 60) of the window 62b of the inserting cap 62 pushes the corresponding rising-and-sinking engaging pieces 64 down to the rear side (to the proximal end of the holding engaging portion 60; namely, to the removing tool main body 51). The rising-and-sinking engaging pieces 64 are pushed into the corresponding concaves 61a and are prevented from projecting from the side portion of the inserting cap 62.

Once the rising-and-sinking engaging pieces 64 are disengaged from the internal housing 28, the urging force of the spring 67 causes the pushing member 66 to push the internal housing 28 to the leading end of the holding engaging portion 60. Then, the BH housing 26 can be taken out easily from the removing tool 50.

For the removing tool 50, the pushing member 66 is formed like a ring that abuts only against the internal housing 28. The pushing member is not limited to this aspect. It is possible to provide a configuration that abuts against the housing main body 35 of the BH housing 26, a configuration that abuts against both housing main body 35 and internal housing 28, or the like. Advantageously, provided that the pushing member is configured to sandwich only the internal housing 28 between itself and the rising-and-sinking engaging pieces 64, it can stably sandwich and hold the internal housing 28 between itself and the rising-and-sinking engaging pieces 64 regardless of movement of the internal housing relative to the housing main body. Furthermore, this sandwiched and held state can be accomplished regardless of the specific structure of the housing main body.

The separation between the disengaging pieces 52a and 52b can be changed by replacing the removing tool main body of the removing tool 50 with a different one and attaching the pawl blocks 51A and 51B to the respective sides of the new removing tool main body. This allows clip removal for a BH housing having any size.

Figure 24:
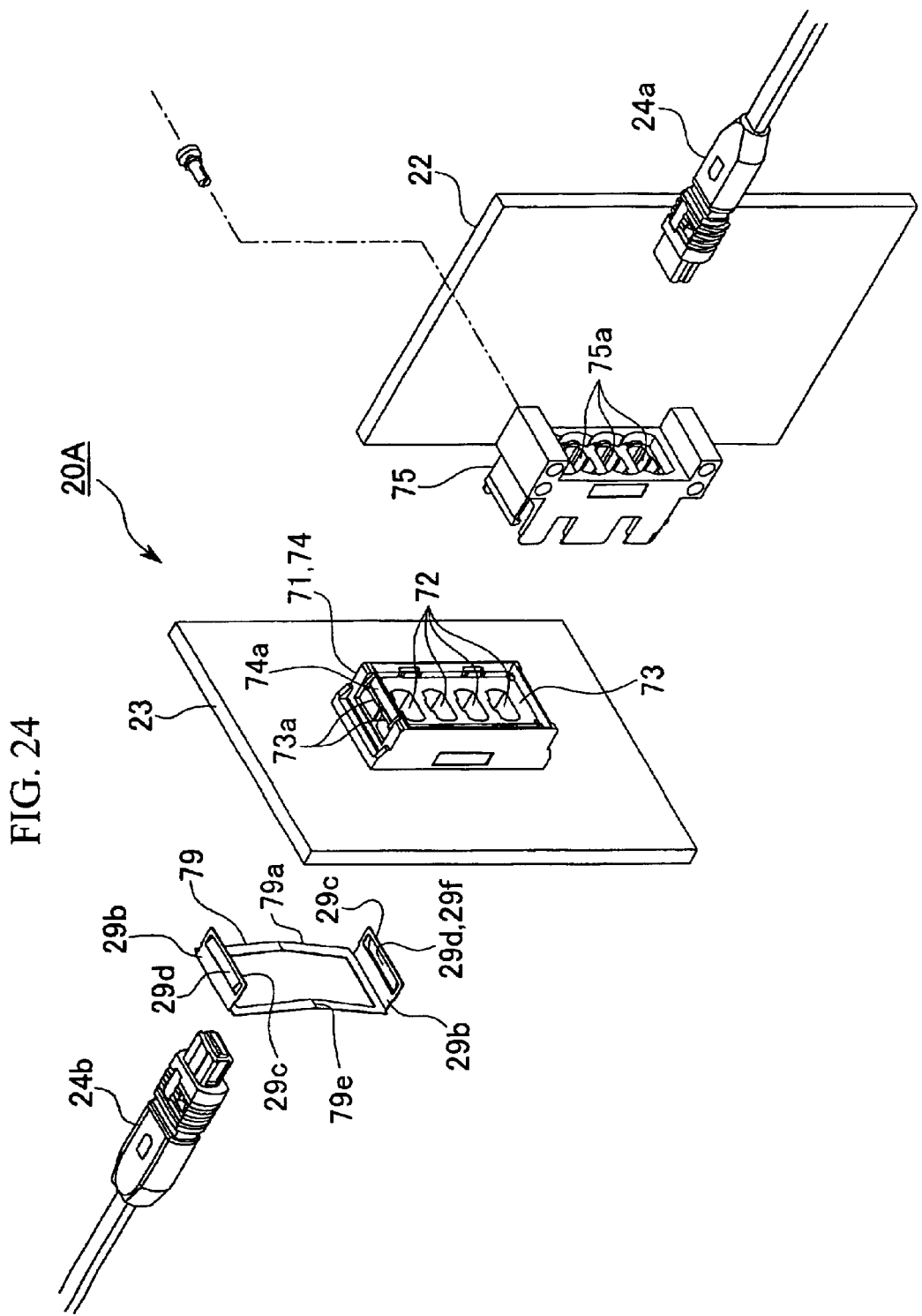
FIG. 24 is an exploded perspective view showing an example of a multi-backplane-connector.
Figure 25:
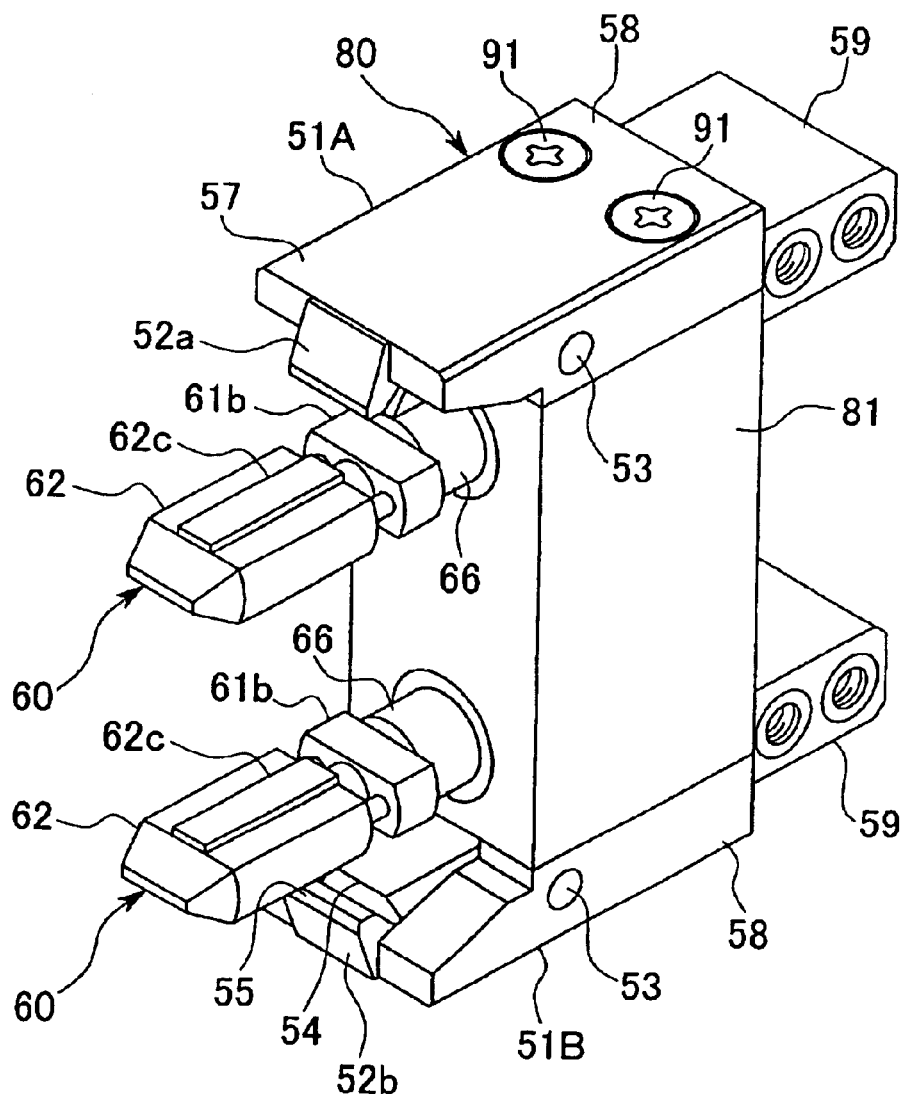
FIG. 25 is a perspective view showing a clip removing tool applied to the BH housing and clip of the backplane connector in FIG. 24.

FIG. 24 is an exploded perspective view showing a multi (quadruple-backplane-connector) 20A (hereinafter sometimes referred to as a "BP connector 20A") corresponding to connection of plural (four) pairs of optical connector plugs 24a and 24b (in FIG. 24, MPO plugs) (however, the plug-in unit 21 is not shown). A backplane housing 71 (hereinafter sometimes referred to as a "BH housing 71") for the BP connector 20A is structured so that an internal housing 73 is housed in a prismatic housing main body 74; a plurality of (four) plug slots 72 are formed in line in the internal housing 73. A printed board housing 75 (hereinafter referred to as a "PH housing 75") in which a plurality of (four) plug slots 75a are similarly formed is attached to the printed board 22. Then, by moving the printed board 22 to the backplane 23 to fit the PH housing 75 into the BH housing 71, a plurality of optical connectors 24a inserted into the respective plug slots 75a in the PH housing 75 for engagement and retention are connected altogether to a plurality of optical connector plugs 24b inserted into the respective plug slots 72 in the BH housing 71 for engagement and retention.

The internal housing 73 is kept housed in the housing main body 74 of the BH housing 71 using a mechanism similar to that for the BH housing 26 illustrated in FIGS. 21 to 23A and 23B. That is, the internal housing 73 is housed stably at a predetermined position within the housing main body 74 by engaging holding engaging pawls of the internal housing 73 with the housing main body 74, abutting abutting pieces 73a of the internal housing 73 against corresponding stopper portions 74a of the housing main body 74, and performing other operations. The internal housing 73 is elongate. The plurality of plug slots 72 are arranged along the longitudinal direction of the internal housing 73.

Furthermore, the housing main body 74 is shaped like a prism also having an elongate rectangular cross section corresponding to the internal housing 73. The housing main body 74 is provided with the pawl inserting slot 33 and the locking portion 34 at each of its longitudinally opposite ends as in the case with the BH housing 26, shown in FIGS. 4, 21, and 22, and other figures.

A clip 79 used to attach the BH housing 71 to the backplane 23 has a main body portion 79a shaped like an elongate frame correspondingly to the BH housing 71 compared to the clip 29 applied to the BH housing 26, shown in FIGS. 21 and 22, and other figures. However, the other arrangements are similar to those of the clip 29 applied to the BH housing 26, for example, the pair of elastic pawls 29b projecting from the longitudinally opposite end portions of the main body portion 79a and the engaging pawls 29d formed at the leading ends of the corresponding elastic pawls 29b.

Figure 28A:
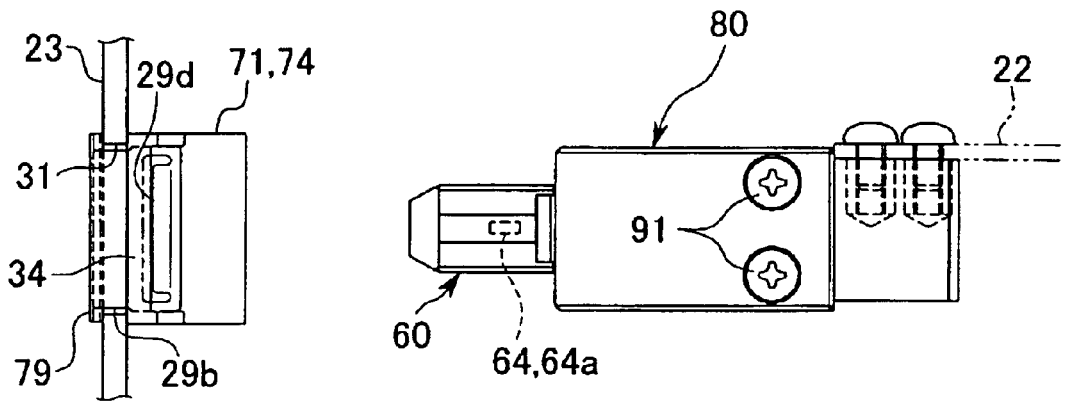
FIG. 28A is a plan view showing a state observed before the clip removing tool in FIG. 25 is pushed against the BH housing.
Figure 28B:
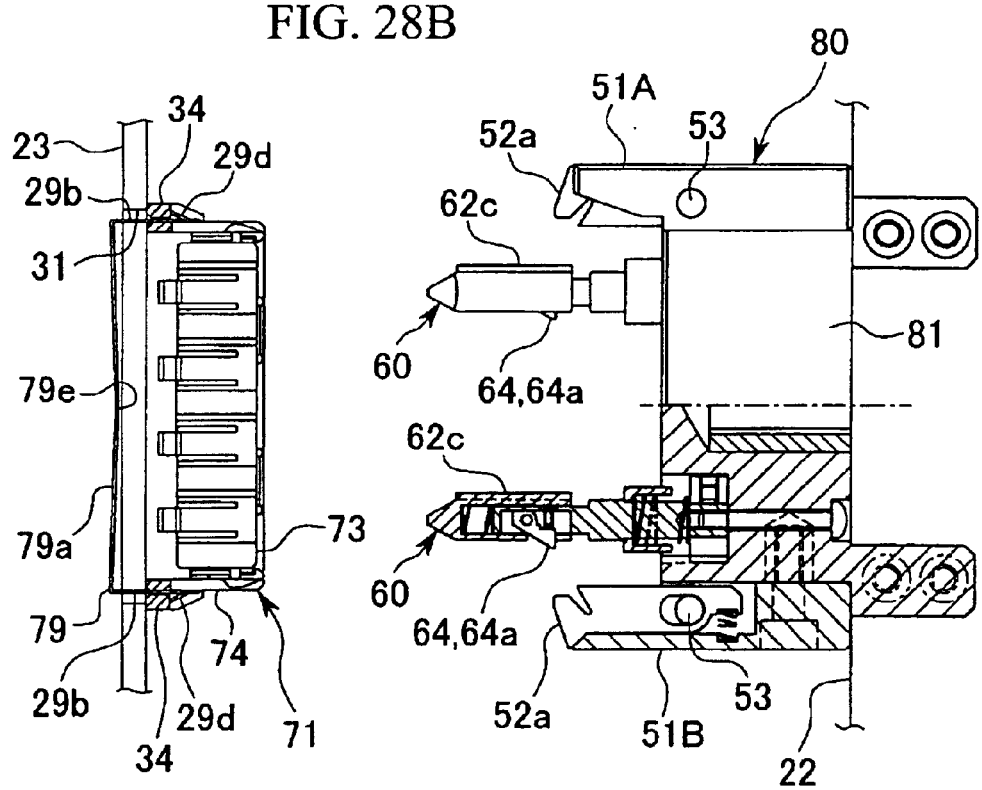
FIG. 28B is a partial side sectional view showing the state observed before the clip removing tool in FIG. 25 is pushed against the BH housing.

A method of engaging the clip 79 with the BH housing 71 and a structure in which the clip 79 is mounted on the backplane 23 are similar to those for the BH housing 26, shown in FIGS. 21 and 22, and other figures. That is, the engaging pawls 29d of the elastic pawl leading end portions 29c are inserted into and penetrating through the corresponding pawl inserting slots 33 formed in the opposite side portions of the BH housing 71 (specifically, the housing main body 74) through the attaching slot 31a (FIGS. 28A and 28B). The engaging pawls 29d are then engaged with the corresponding locking portions 34 to sandwich the backplane 23 between the BH housing 71 and the clip 79. On the basis of the movable range of the elastic pawl 29d within the attaching slot 31a and the range of elastic deformation of the main body portion 79a of the clip 79, the BH housing 71 is mounted on the backplane 23 while maintaining the desired movement range. Also, as in the case with the BH housing 26, shown in FIGS. 21 and 22, and other figures, the engaging pawls 29d of the elastic pawl leading end portions 29c are kept locked on the corresponding locking portions 34 of the BH housing 71 by abutting a top portion 79e formed by curving or bending (in FIG. 24, bending) the main body portion 79a, against the backplane 23 to allow the main body portion 79a to exert its own spring force.

However, the attaching slot 31a opened in the backplane 23 is large enough to allow the optical connector plug 24b to be inserted into each of the plug slots 72 in the BH housing 71 (specifically, the internal housing 73) and to prevent interference with the optical connector plug 24b associated with movement of the BH housing 71. It is larger than the attaching slot 31 shown in FIG. 21 or the like.

FIGS. 25 to 35 show a clip removing tool 80 (hereinafter sometimes referred to as a "removing tool 80") applied to removal of the clip 79 from the BH housing 71 of the BP connector 20A.

In FIGS. 25 to 28A and 28B, the removing tool 80 comprises a block-like removing tool main body 81 having the pawl blocks 51A and 51B attached to its opposite side portions. Thus, the dimensions of the removing tool main body 81 allow the separation between the disengaging pieces 52a and 52b of the pawl blocks 51A and 51B, respectively, to correspond to the positions at which the engaging pawls 29d engage with the corresponding locking portions 34 located on opposite sides of the BH housing 71. The pawl blocks 51A and 51B are removably attached to the removing tool main body 81 using screws 91.

Furthermore, two holding engaging portions 60 are attached to the removing tool main body 81. As shown in FIGS. 27A to 27D, the removing tool main body 81 is provided with fixing holes 81a in which the corresponding holding engaging portions 60 are fixed. The fixing holes 81a are shaped similarly to the fixing hole 51a formed in the removing tool main body 51 of the removing tool 50, previously described. The holding engaging portions 60 are fixed as in the case with the fixing hole 51a. Furthermore, also as with the fixing hole 51a in the removing tool main body 51 of the removing tool 50, the holding engaging portions 60 are fixed in a predetermined orientation by engaging keys 81b formed in the fixing holes 81a with corresponding key grooves 68a in the respective holding engaging portions 60.

Also as with the removing tool main body 51, previously described, the selected removing tool main body 81 must be configured so that the orientation of the holding engaging portions 60 with respect to the removing tool main body corresponds to that of the plug slots 72 in the internal housing 73 of the BH housing 71 to which the removing tool 80 is applied. Specifically, for the BH housing 26 to which the removing tool 50 is applied, the direction y of sectional major axis (see FIG. 22) of the plug slot 28a in the internal housing 28 substantially coincides with the vertical direction (the direction between the pair of pawl inserting holes 33 in the housing main body 35; namely, the vertical direction of FIG. 22) of the BH housing 26. The direction x of minor axis orthogonal to the direction of the major axis substantially coincides with a lateral direction orthogonal to the vertical direction. On the other hand, as shown in FIG. 24, for the BH housing 71 to which the removing tool 80 is applied, each of the plug slots 72 in the internal housing 73 has the same sectional shape as the plug slot 28a in the BH housing 26. However, as is apparent from the position of the key groove 72a, the width of the plug slot 72 in the direction of its minor axis substantially coincides with the width of the housing main body 74 in the vertical direction (in FIG. 24) corresponding to the longitudinal direction of the housing main body 74. Furthermore, the width of the plug slot 72 in the direction of its major axis substantially coincides with the width of the housing main body 74 in a lateral direction orthogonal to the vertical direction. As a result, the direction of the plug slots is at 90° with the direction of the plug slot in the BH housing 26 to which the removing tool 50 is applied. Accordingly, the orientation in which the holding engaging portion 60 is fixed to the removing tool main body 81 is at 90° with the orientation in which the holding engaging portion is fixed to the removing tool main body 51 of the removing tool 50.

An operation of removing the clip 79 using the removing tool 80 can be easily performed exactly like the operation of removing the clip 29 using the removing tool 50, shown in FIGS. 11 to 19, and other figures.

Furthermore, the printed board 22 or the operation lever 90 can be attached to the removing tool main body 81 using the attachment 59 provided at the rear end of the removing tool main body 81 in a direction in which it is pushed against the BH housing 71. Accordingly, the printed board 22 or the operation lever 90 can be used as an operation handle to efficiently perform operations such as insertion and removal of the clip into and from the plug-in unit 21 and advancement and retreat of the plug-in unit toward and from the BH housing 71.

How the operation lever 90 is attached is not shown. However, the removing tool main body 81 has a screw hole 59b formed in its rear end surface, so that the operation lever 90 can be attached by screwing the lever into the screw hole 59b. At this time, a part of the removing tool main body 81 which is located around the screw hole 59b functions as an attachment.

The removing tool main body 81 is provided with a plurality of (in this case, two) holding engaging portions 60 projecting from the main body 81. The holding engaging portions 60 are inserted into and engaged with the internal housing 73 incorporated in the BH housing 71 so as to stably support the BH housing 71 when the clip 79 is removed. At this time, the clip removing tool 80 also functions as a holding tool that holds the BH housing 71 as an optical connector. As shown in FIG. 28B and other figures, the internal housing 73, incorporated in the BH housing 71, is provided with the connector holding pawl 40 for each of the plug slots 72, like the internal housing 28 of the BH housing 26 shown in FIGS. 23A to 23C, and other figures. The holding engaging portions 60 can support the BH housing 71 by engaging the connector holding pawls 40 with engaging concaves 60a.

To stably support the BH housing 71, the holding engaging portions 60 are inserted into all or selected ones of the plurality of plug slots 72 in the BH housing 71 (in FIG. 29 and other figures, two of the plug slots 72 which are located at the opposite ends of the arrangement) so as to substantially evenly and stably support the load of the BH housing 71 instead of maldistributing it. It should be appreciated that the removing tool main body must be properly selected to enable the holding engaging portions 60 to be attached so as to project from the positions of the plug slots 72 in the internal housing 73 of the BH housing 71.

Specific description will be given of a method of removing the clip 79 using the removing tool 80.

Figure 29A:
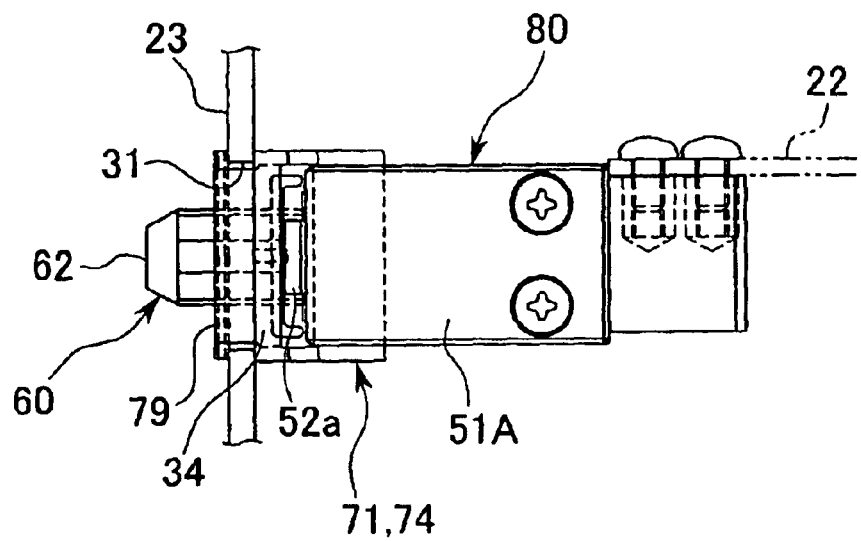
FIG. 29A is a plan view showing that the clip removing tool in FIG. 25 has been pushed against the BH housing.
Figure 29B:
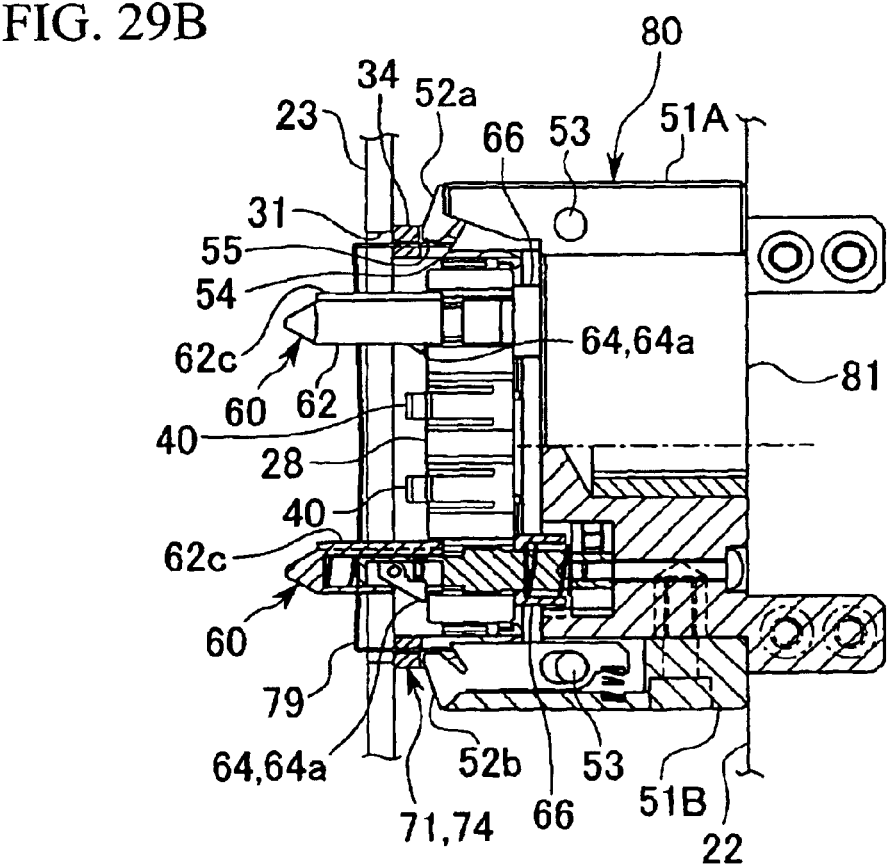
FIG. 29B is a partial side sectional view showing that the clip removing tool in FIG. 25 has been pushed against the BH housing.
Figure 33:
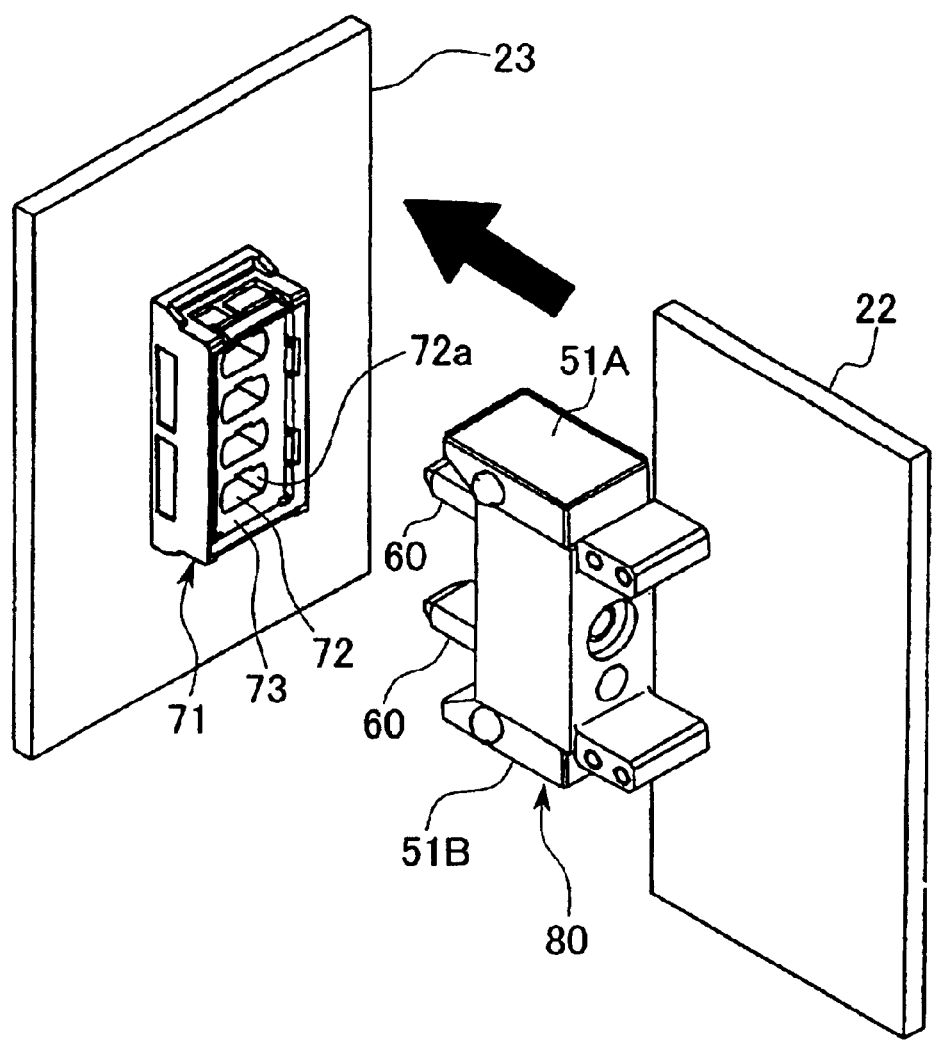
FIG. 33 is a perspective view showing a clip removing method using the clip removing tool in FIG. 25 and also showing a state before the clip removing tool is pushed against the BH housing.
Figure 34:
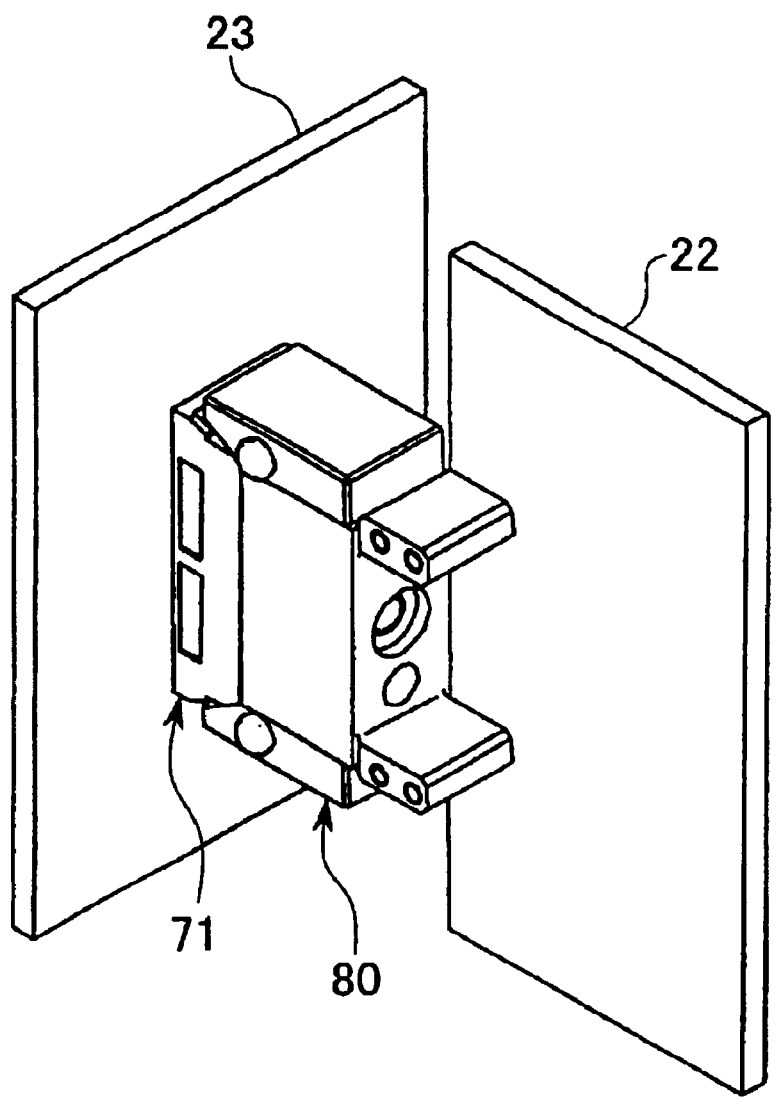
FIG. 34 is a perspective view showing the clip removing method using the clip removing tool in FIG. 25 and also showing that the clip removing tool has been pushed against the BH housing.

As shown in FIG. 33 (in this figure, however, illustration of the clip 79 is omitted), the removing tool 80 is inserted into the plug-in unit 21 and moved closer to the BH housing 71 attached to the backplane 23. Then, as shown in FIGS. 29A and 29B and 34, the holding engaging portions 60 are inserted into the plug slots 72 in the internal housing 73 of the BH housing 71. Furthermore, the rising-and-sinking engaging pieces 64 are moved so as to slip out of the backplane 23 side of each plug slot 72, and are thus projected from the side portion of the inserting cap 62. Furthermore, the removing tool 80 is further pushed into the plug-in unit 21 to cause the engaging pawl pushing portions 55 of the disengaging pieces 52a and 52b of the pawl blocks 51A and 51B, arranged on the opposite sides of the removing tool 80, to push the engaging pawls 29d of the elastic pawls 29b, arranged on the opposite sides of the clip 79, so as to push the engaging pawls 29d down. Thus, the engaging pawls 29d are pushed into the corresponding slots 29f in the elastic pawls 29b and are thus disengaged from the corresponding locking portions 34 of the BH housing 71. As the removing tool 80 is pushed in, the pawl blocks 51A and 51B, arranged on the opposite sides of the removing tool 80, perform operations similar to the operations (previously described with reference to FIGS. 14 to 16) of disengaging the engaging pawls 29d of the clip 29 from the corresponding locking portions 29d of the BH housing 26 and pushing the elastic pawls 29b into the pawl inserting slots 33 in the BH housing 71, the operations being performed by the pair of pawl blocks 51A and 51B of the removing tool 50, previously described. Then, when the removing tool 80 reaches the pushing limit (the position at which the engaging pawl pushing portions 55 of the disengaging pieces 52a and 52b abut against the corresponding locking portions 34 of the BH housing 71), the elastic pawls 29b are pushed into the corresponding pawl inserting slots 33 in the BH housing 71. Thus, the clip 79 is reliably disengaged from the housing main body 74 of the BH housing 71.

Figure 30A:
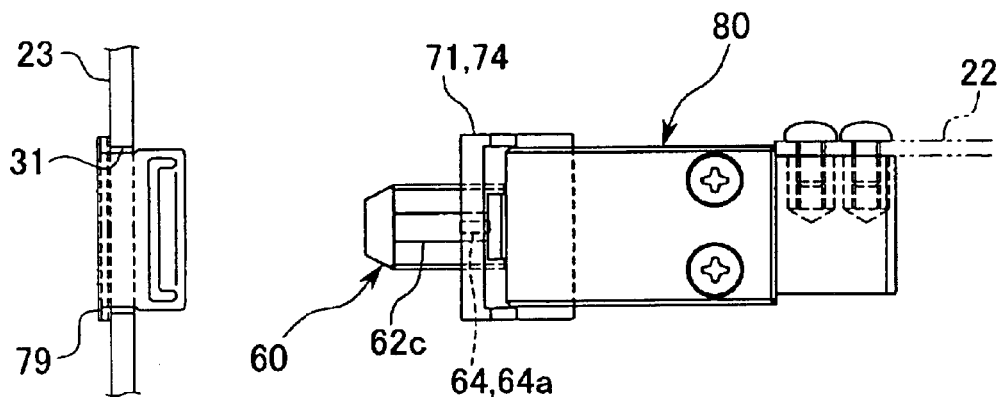
FIG. 30A is a plan view showing that the BH housing, from which the clip was removed using the clip removing tool in FIG. 25, has been taken out from the plug-in unit together with the clip removing tool.
Figure 30B:
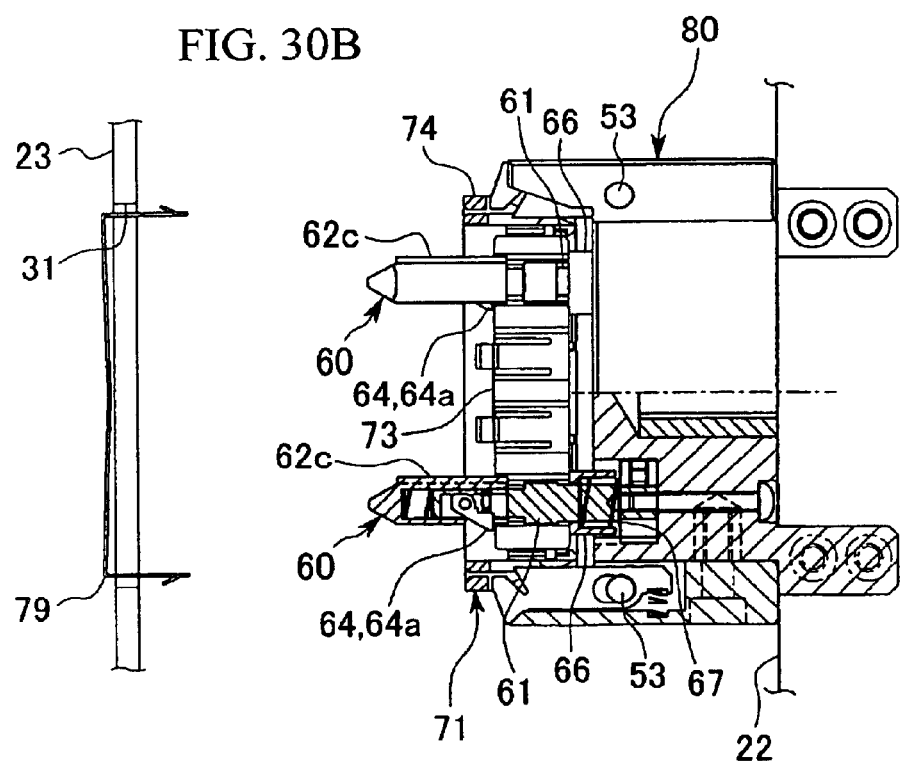
FIG. 30B is a partial side sectional view showing that the BH housing, from which the clip was removed using the clip removing tool in FIG. 25, has been taken out from the plug-in unit together with the clip removing tool.
Figure 35:
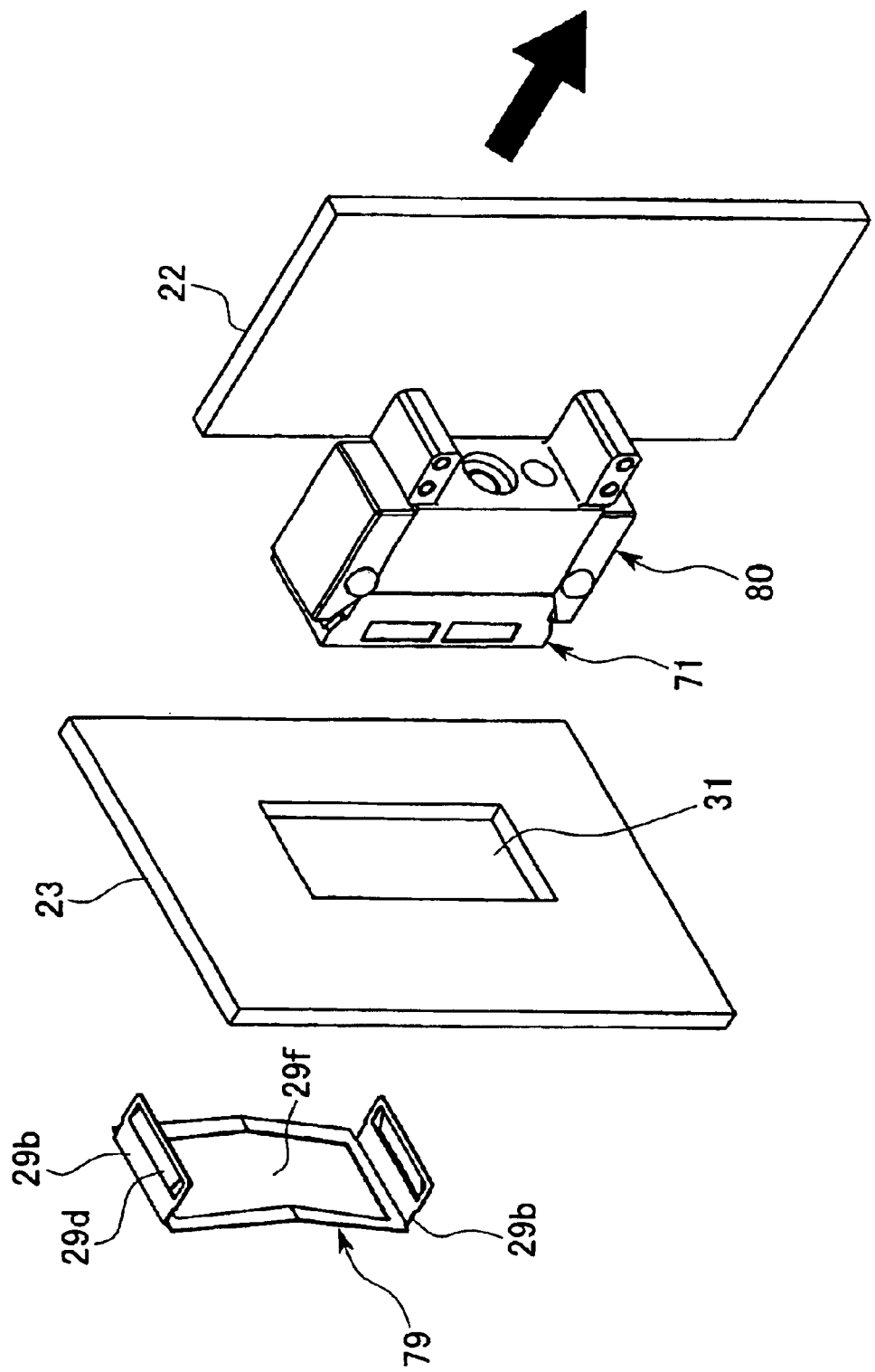
FIG. 35 is a perspective view showing the clip removing method using the clip removing tool in FIG. 25 and also showing that the BH housing, disengaged from the clip using the clip removing tool, has been drawn out from the plug-in unit integrally with the clip removing tool.
Figure 36:
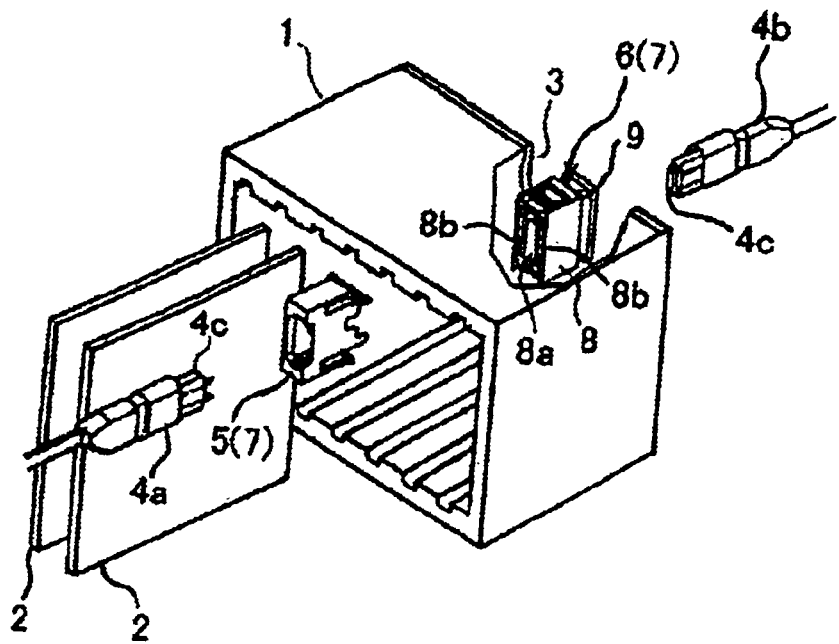
FIG. 36 is an exploded perspective view showing an example of a conventional backplane connector.
Figure 37:
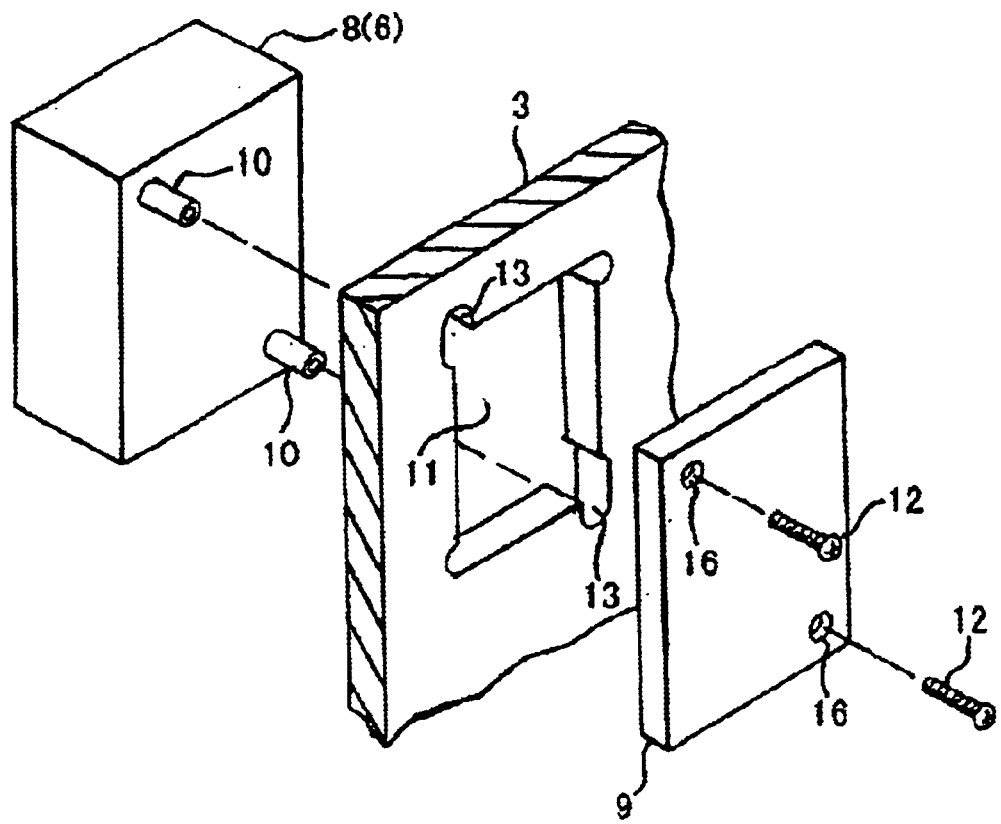
FIG. 37 is an exploded perspective view showing a structure in which a BH housing and a rear surface housing are fixed together in the backplane connector in FIG. 36.

Once the clip 79 is disengaged from the housing main body 74 of the BH housing 71, the removing tool 80 is pulled out from the plug-in unit 21 as shown in FIGS. 30 and 35. Thus, since the rising-and-sinking engaging pieces 64 of the holding engaging portions 55 are engaged with the internal housing 73 of the BH housing 71, the BH housing 71 is pulled out from the plug-in unit 21 integrally with the removing tool 80.

The BH housing 71 is pulled out with its internal housing 73 remaining sandwiched between the rising-and-sinking engaging pieces 64 of the plurality of holding engaging portions 60 and the pushing members 66 because of the urging force of the spring 67.

In this regard, in the configuration in which the BH housing 71 is pulled out while being held by the holding engaging portions 60, the range of expansion and contraction of the spring 67 permits the BH housing 71 to oscillate slightly. Advantageously, this substantially avoids inconveniences during a draw-out operation; it prevents any optical part of the plug-in unit 21 from coming into contact with and being damaged by the BH holder 71 or prevents any optical fiber from being caught and cut by the BH housing 71.

Figure 31A:
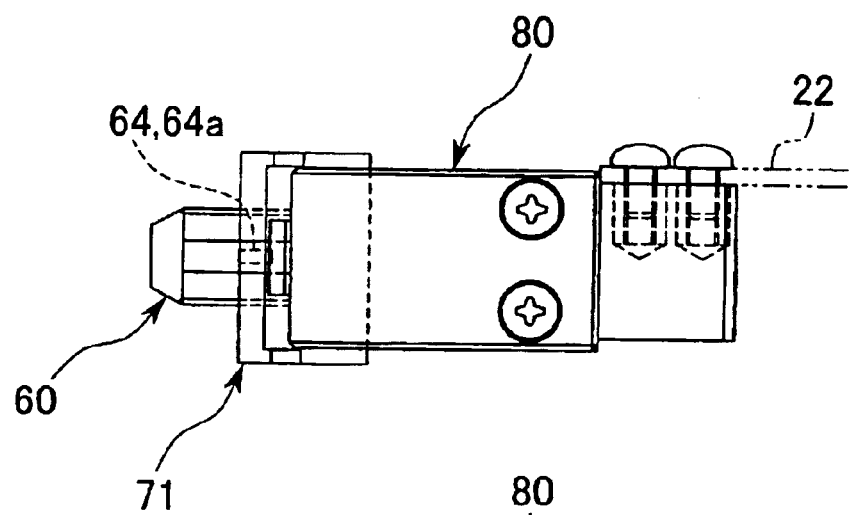
FIG. 31A is a plan view showing that the inserting cap of the holding engaging portion of the clip removing cap in FIG. 30 has been pushed into a proximal end of the holding engaging portion to disengage the rising-and-sinking engaging piece from the internal housing.
Figure 31B:
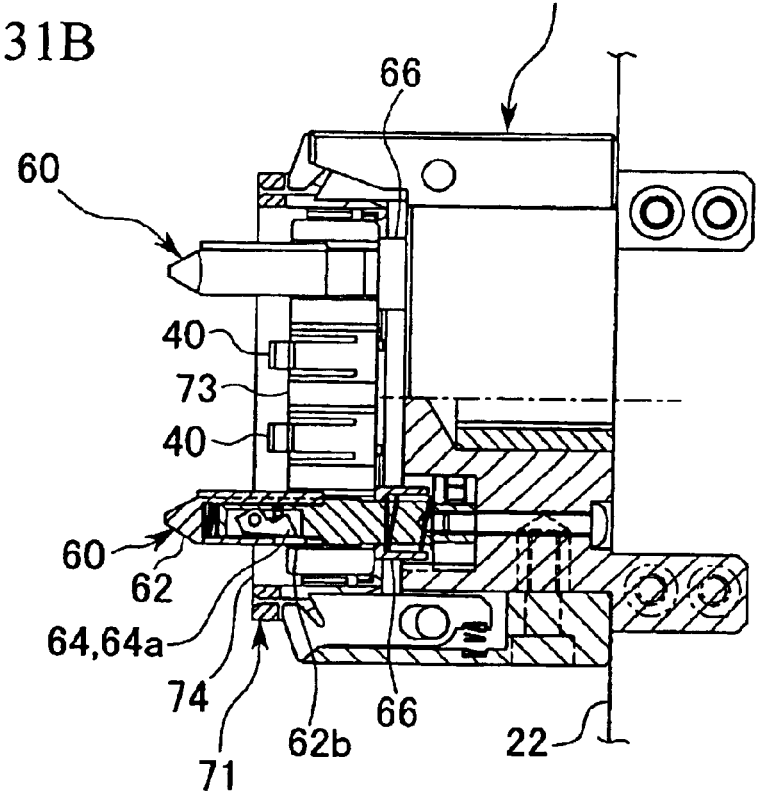
FIG. 31B is a partial side sectional view showing that the inserting cap of the holding engaging portion of the clip removing cap in FIG. 30 has been pushed into the proximal end of the holding engaging portion to disengage the rising-and-sinking engaging piece from the internal housing.
Figure 32A:
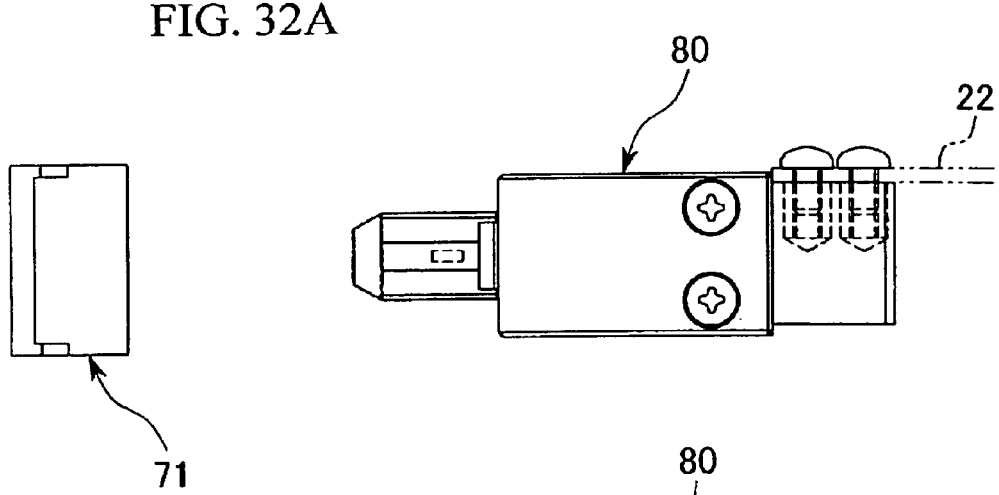
FIG. 32A is a plan view showing that the BH housing has been separated from the clip removing tool in FIG. 30.
Figure 32B:
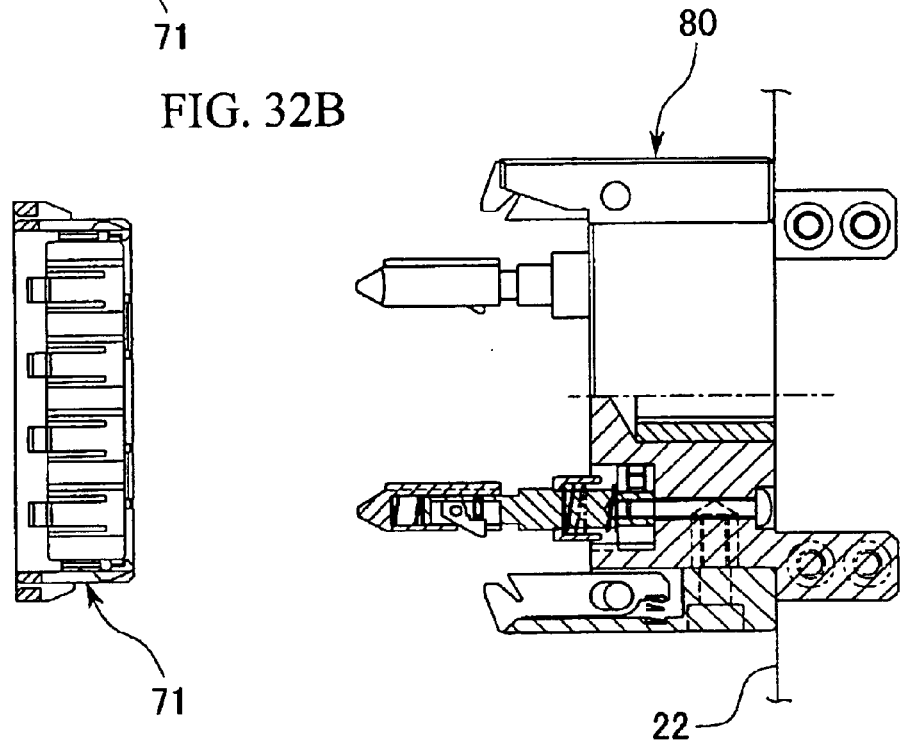
FIG. 32B is a partial side sectional view showing that the BH housing has been separated from the clip removing tool in FIG. 30.

After the BH housing 71 has been pulled out from the plug-in unit 21, the rising-and-sinking engaging pieces 64 are disengaged from the internal housing 73 by pushing the inserting caps 62 of the holding engaging portions 60 toward the proximal ends of the holding engaging portions. 60 (toward the removing tool main body 81) as shown in FIGS. 31A and 31B. As a result, as shown in FIGS. 32A and 32B, the BH housing 71 is separated from the removing tool 80.

It should be appreciated that the present invention is not limited to the configurations previously described in the embodiments but that various changes may be made to their designs.

For example, it is possible to properly change the design of the specific shape of the disengaging pieces, the holding engaging portions, or the like.

For example, the disengaging pieces have only to be able to disengage the engaging pawls of the clip from the locking portions of the backplane housing. The disengaging pieces are not limited to the configuration having the abutting portion and engaging pawl pushing portion provided at its leading end but may be variously configured. The engaging pawls of the clip, which engage with the corresponding locking portions of the backplane housing, may be variously shaped. Correspondingly, the disengaging pieces may be shaped to be able to disengage the engaging pawls of the clip from the corresponding locking portions of the backplane housing. For example, for a clip provided with a pair of elastic pawls engaging with the backplane housing so as to grip it from both sides of it, a configuration with a pair of disengaging pieces may be employed which is configured to push open the elastic pawls outward.

Furthermore, possible specific configurations of the disengaging pieces include:

(1) one in which by pushing in the clip removing tool toward the backplane housing, the engaging pawls are first pushed in to reduce the amount of part of each engaging pawl which projects from the corresponding elastic pawl leading end portion, and then the elastic pawls start to be pushed in to push the clip out to a position at which the engaging pawls do not engage with the back plane housing, while keeping the engaging pawls pushed in (maintaining the reduced amount of projection) (the configuration described in the above embodiment), (2) one in which by pushing in the clip removing tool toward the backplane housing, the engaging pawls are pushed in to reduce the amount of projection from the elastic pawl leading ends, while the elastic pawls are simultaneously pushed out, and (3) one in which by pushing in the clip removing tool toward the backplane housing, the elastic pawls first start to be pushed out and the engaging claws then start to be pushed in so as to reduce the amount of projection from the engaging pawl leading end portions.

However, with a clip removing tool provided with holding engaging portions, whether the disengaging pieces have the configuration (1), (2), or (3), the holding engaging pieces engage with the backplane housing or become able to engage with it before the engaging pawls of the clip are disengaged from it.

The holding engaging portions are not limited to those which engage with the backplane-side end surface of the internal housing as illustrated in the above embodiment. The holding engaging portions may be variously configured; they may engage with the interior of the internal housing or the like or the its housing main body (the sheath portion in which the internal housing is housed). For example, for a backplane housing provided with a fitting groove formed between an internal housing and a housing main body in which the internal housing is housed so that a fitting pawl projecting from a printed board housing can be inserted and fitted into the fitting groove, it is possible to employ a configuration fitted into the backplane housing as in the case with the printed board housing, a configuration having a pawl inserted into and engaged with the fitting groove, or the like.

Further, the pushing member 66 and spring 67 of the holding engaging portion 60, shown in the above described embodiments, are used to stably hold the backplane housing after the clip has been removed. Accordingly, a configuration from which the pushing member 66 or the spring 67 is omitted is sufficient to draw out the backplane housing disengaged from the clip, from the plug-in unit together with the removing tool.

Furthermore, the scope of this clip removing tool is not limited to optical connectors provided with the internal housing. The clip removing tool is applicable to an optical connector without an internal housing. Moreover, for example, even for a backplane connector including a backplane housing provided with plural rows of plug slots, the clip removing tool according to the present invention is of course applicable to removal of a clip used to attach the backplane connector to a backplane. In this case, the size of the clip may be increased correspondingly to the backplane housing of a size increased to deal with the large number of plug slots. In such a case, a clip removing tool is applicable which is provided with plural pairs of disengaging pieces. Then, the clip can be efficiently removed because the plural pairs of disengaging pieces simultaneously disengage the clip from the backplane housing (specifically, its locking portions).

Furthermore, in the above described embodiments, the illustrated clip removing tool is assembled by attaching the pawl block provided with the disengaging pieces to the block-like removing tool main body. However, the present invention is not limited to this aspect. For example, it is possible to employ a configuration in which the disengaging pieces are provided directly on one predetermined removing tool main body. However, as illustrated in the embodiments, if the removing tool main body is configured to be replaceable, the separation between the disengaging pieces can be easily set. Furthermore, it should be appreciated that this configuration also allows the easy selection of a removing tool main body provided with holding engaging portions compatible with an optical connector such as a backplane housing which is attached to the backplane.

The optical connector attached to the backplane is not limited to the previously described backplane housing. For example, optical connectors having various configurations based on a male and female fitting structure can be employed, for example, optical connector adapters themselves (shaped like an optical connector adapter for an SC type optical connector specified in JIS C 5973 and an optical connector adapter for an MPO type optical connector specified in JIS C 5982). In this case, the shape of the clip varies depending on the specific shape of the attached optical connector. Correspondingly, the shape of the removing tool varies.

As described above, according to the clip removing tool according to the present invention, the simple pushing operation on the optical connector allow the engaging pawls of the elastic pawl leading end portions of the clip to be easily disengaged from the corresponding locking portions of the optical connector using the disengaging pieces. That is, the disengaging pieces can be used to easily disengage the clip from the optical connector by elastically deforming the engaging pawls projecting from the side portions of the corresponding elastic pawl leading end portions and engaging with the optical connector. Furthermore, provided that for example, the removing tool comprises, at its leading end, the engaging pawl pushing portions that push the corresponding engaging pawls of the clip to disengage the engaging pawls from the corresponding locking portions of the optical connector, and the abutting portions that push the corresponding engaging pawls, the clip removing operation can be easily performed simply by pushing the removing tool.

Furthermore, if the removing tool main body is provided with the attachment used to separately attach the operation handle for an operation of advancement toward and retreat from the optical connector, the removing tool can be efficiently pushed against an optical connector installed in a plug-in unit or in other small area by operating the operation handle attached to the removing tool main body using the attachment. This allows the clip to be removed more easily.

Furthermore, if the removing tool main body is provided with the holding engaging portions that engage with the optical connector, it is possible to prevent the optical connector from which the clip has been removed, from falling from the backplane, by engaging the holding engaging portions with the optical connector. This in turn prevents inconveniences such as damage to the optical connector resulting from the fall. Furthermore, by drawing out the removing tool from the neighborhood of the backplane, the optical connected can also be drawn out integrally with the removing tool. This is very effective because the optical connector can be taken out more easily from a small area such as the interior of the plug-in unit.

Moreover, if the configuration is employed in which the clip is disengaged from the optical connector held using a holding tool, inconveniences can be prevented such as damage to the optical connector resulting from its fall associated with its disengagement from the clip. Furthermore, by drawing out the holding tool from the neighborhood of the backplane, the optical connector can also be drawn out integrally with the holding tool and can thus be taken out easily from the neighborhood of the backplane. Thus, in particular, the optical connector can be taken out more easily from a small area such as the interior of the plug-in unit.

The term "clip" as used herein refers generally to members used to attach the optical connector to the backplane.

The clip is not limited to the U-shaped member shown in the above-described embodiment. That is, the above-described clip includes members of various shapes used depending on the type of the optical connectors, as described above, the ease with which the optical connector is attached, the position at which the optical connector is attached, or the like.

What is claimed is:

1. A clip removing tool used to disengage an optical connector from a clip used to attach said optical connector to a backplane, the clip removing tool being characterized by comprising a removing tool main body advanced toward or retreated from said optical connector and disengaging pieces projecting from the removing tool main body, and in that said disengaging pieces are pushed against engaging pawls projecting from side portions of elastic pawl leading end portions of said clip, to deform said engaging pawls to reduce the amount of parts of the engaging pawls which project from said elastic pawl leading end portions, thus disengaging said engaging pawls from said optical connector.

2. The clip removing tool according to claim 1, characterized in that said disengaging pieces are pushed against the engaging pawls projecting from the side portions of the elastic pawl leading end portions of said clip to deform said engaging pawls, thus reducing the amount of parts of said engaging pawls which project from said elastic pawl leading end portions.

3. The clip removing tool according to claim 1, characterized in that said disengaging pieces are rotatably supported on the removing tool main body, and each comprise, at its leading end in a direction in which the disengaging piece projects from said removing tool main body, an engaging pawl pushing portion that pushes said corresponding engaging pawl to reduce the amount of part of said engaging pawl which projects from said elastic pawl leading end portion, thus disengaging the engaging pawl from a locking portion provided in said optical connector, and an abutting portion that pushes said corresponding elastic pawl as the removing tool main body advances toward the optical connector.

4. The clip removing tool according to claim 2, characterized in that said disengaging pieces are rotatably supported on the removing tool main body, and each comprise, at its leading end in a direction in which the disengaging piece projects from said removing tool main body, an engaging pawl pushing portion that pushes said corresponding engaging pawl to reduce the amount of part of said engaging pawl which projects from said elastic pawl leading end portion, thus disengaging the engaging pawl from a locking portion provided in said optical connector, and an abutting portion that pushes said corresponding elastic pawl as the removing tool main body advances toward the optical connector.

5. The clip removing tool according to claim 1, characterized in that said removing tool main body is provided with an attachment used to separately attach an operation handle for an operation of advancement toward or retreat from said optical connector.

6. The clip removing tool according to claim 2, characterized in that said removing tool main body is provided with an attachment used to separately attach an operation handle for an operation of advancement toward or retreat from said optical connector.

7. The clip removing tool according to claim 3, characterized in that said removing tool main body is provided with an attachment used to separately attach an operation handle for an operation of advancement toward or retreat from said optical connector.

8. The clip removing tool according to claim 4, characterized in that said removing tool main body is provided with an attachment used to separately attach an operation handle for an operation of advancement toward or retreat from said optical connector.

9. The clip removing tool according to any of claims 1 to 8, characterized in that said removing tool main body is provided with a holding engaging portion that engages with the optical connector.

10. A clip removing method of disengaging an optical connector from a clip used to attach said optical connector to a backplane, the method being characterized by comprising pushing a holding tool to said backplane to disengage said clip from said optical connector.

11. The clip removing method according to claim 10, characterized by further comprising disengaging elastic pawls of said clip from said optical connector held using said holding tool and then removing said optical connector from a neighborhood of said backplane together with said holding tool.

12. The clip removing method according to claim 11, characterized in that said elastic pawls are disengaged from said optical connector by pushing engaging pawls projecting from side portions of elastic pawl leading end portions of said clip to reduce the amount of parts of said engaging pawls which project from said elastic pawl leading end portions, and with this state maintained, pushing said elastic pawl leading end portions to move said elastic pawls to positions where said engaging pawls do not engage with the optical connector.

* * * * *

UNITED STATES PATENT AND TRADEMARK OFFICE
CERTIFICATE OF CORRECTION

PATENT NO. : 6,819,855 B2
DATED : November 16, 2004
INVENTOR(S) : Kunihiko Fujiwara et al.

It is certified that error appears in the above-identified patent and that said Letters Patent is hereby corrected as shown below:

Title page,
Item [30], Foreign Application Priority Data, please add
-- August 2, 2001 (JP) ………………….. 2001-235434 --.

Signed and Sealed this

Nineteenth Day of April, 2005

JON W. DUDAS
*Director of the United States Patent and Trademark Office*